US012748552B2

(12) United States Patent
Cho et al.

(10) Patent No.: US 12,748,552 B2
(45) Date of Patent: Sep. 29, 2026

(54) ELECTRONIC DEVICE INCLUDING STORAGE DEVICE AND CONTROLLER AND OPERATING METHOD THEREOF

(71) Applicant: SK hynix Inc., Icheon-si (KR)

(72) Inventors: Dong Hyun Cho, Icheon-si (KR); Eun Ju Yoon, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/991,064

(22) Filed: Dec. 20, 2024

(65) Prior Publication Data

US 2025/0123771 A1 Apr. 17, 2025

Related U.S. Application Data

(63) Continuation of application No. 18/360,139, filed on Jul. 27, 2023, now Pat. No. 12,197,778.

(30) Foreign Application Priority Data

Feb. 1, 2023 (KR) ........................ 10-2023-0013681

(51) Int. Cl.
*G06F 3/06* (2006.01)

(52) U.S. Cl.
CPC .......... *G06F 3/0658* (2013.01); *G06F 3/0607* (2013.01); *G06F 3/0656* (2013.01); *G06F 3/0679* (2013.01)

(58) Field of Classification Search
CPC .... G06F 3/0658; G06F 3/0607; G06F 3/0656; G06F 3/0679; G06F 3/0644;
(Continued)

(56) References Cited

U.S. PATENT DOCUMENTS

2016/0154594 A1* 6/2016 Kang .................. G06F 12/0246
711/103
2021/0073139 A1* 3/2021 Sheridan ............. G06F 12/0646
(Continued)

FOREIGN PATENT DOCUMENTS

KR 20150106132 A 9/2015
KR 101686340 B1 12/2016
(Continued)

*Primary Examiner* — Than Nguyen

(74) *Attorney, Agent, or Firm* — Ashurst Perkins Coie US LLP

(57) ABSTRACT

A storage device includes: a nonvolatile storage area for storing a plurality of map segments including information of one or more map entries representing mapping information between a logical address provided by an external device and a physical address corresponding to the logical address; a volatile storage area for temporarily storing journal data including information that keeps track of changes to the mapping information to enable for updating the mapping information; and a controller in communication with the nonvolatile storage area and the volatile storage area and configured to count a number of first map segments that store the updated mapping information, and updating the mapping information in the nonvolatile storage area according to a ratio of a number of logical addresses included in the journal data and the number of first map segments.

10 Claims, 21 Drawing Sheets

(58) Field of Classification Search
CPC .... G06F 3/0604; G06F 3/0614; G06F 3/0659; G06F 12/10; G06F 12/1009
USPC .......................................................... 711/154
See application file for complete search history.

(56) References Cited

U.S. PATENT DOCUMENTS

| | | | | |
|---|---|---|---|---|
| 2021/0223979 | A1* | 7/2021 | Li | G06F 3/061 |
| 2024/0193053 | A1* | 6/2024 | Ji | G06F 12/0246 |

FOREIGN PATENT DOCUMENTS

| | | | |
|---|---|---|---|
| KR | 20200110863 | A | 9/2020 |
| KR | 20200126491 | A | 11/2020 |

* cited by examiner

FIG. 6

1130

| MAP SEGMENT(LBA) | BITMAP |
|---|---|
| 1 (LBA 1 ~ 100) | 1 |
| 2 (LBA 101 ~ 200) | 1 |
| 3 (LBA 201 ~ 300) | 0 |
| 4 (LBA 301 ~ 400) | 0 |
| 5 (LBA 401 ~ 500) | 0 |
| ⋮ | |

'SET' STATE
'SET' STATE
'RELEASE' STATE
'RELEASE' STATE
'RELEASE' STATE

FIG. 12

| CAPACITY OF MAP STORAGE | NUMBER OF REQUIRED CONSECUTIVE DIRTY MAP SEGMENTS |
|---|---|
| INCREASE | DECREASE |
| DECREASE | INCREASE |

ELECTRONIC DEVICE INCLUDING STORAGE DEVICE AND CONTROLLER AND OPERATING METHOD THEREOF

PRIORITY CLAIM AND CROSS-REFERENCE TO RELATED APPLICATION

This patent document is a continuation of U.S. patent application Ser. No. 18/360,139, filed Jul. 27, 2023, which claims priority to and benefits of the Korean patent application number 10-2023-0013681, filed on Feb. 1, 2023, which are incorporated herein by reference in their entireties.

TECHNICAL FIELD

The technology and implementations disclosed in this patent document relate to an electronic device, and more particularly, to a controller and an operating method thereof.

BACKGROUND

Storage device refers to electronic components that are configured to store data based on a control of a host device such as a computer or a smart phone. The data storage device may include a memory device for storing data and a memory controller for controlling the memory device. The memory device is classified into a volatile memory device and a nonvolatile memory device depending on its capability to hold stored data in the absence of power.

A volatile memory device may store data only when power is supplied. Thus, such a volatile memory device loses its data in the absence of power. Examples of the volatile memory device include a Static Random Access Memory (SRAM) or a Dynamic Random Access Memory (DRAM).

A nonvolatile memory device is a memory device that can retain its data in the absence of power. Examples of the nonvolatile memory device include a Read Only Memory (ROM), a Programmable ROM (PROM), an Electrically Programmable ROM (EPROM), an Electrically Erasable ROM (EEROM), or a flash memory.

The memory controller may program data in a physical address area corresponding to a logical address provided by a host. The memory controller may translate the logical address into a physical address in a state in which map data including mapping information between logical and physical addresses are cached in the volatile memory device, or reflect the logical address on information map data about an updated physical address corresponding to the logical address. When the capacity of map data which can be cached in the volatile memory device is limited, a read operation and a program operation on required map data may be essentially accompanied. When a limited map caching area is efficiently used, unnecessary performance of read and program operations can be prevented.

SUMMARY

Embodiments provide an electronic device capable of efficiently using a map caching area and an operating method of the electronic device. While the map caching area has a limited size in the electronic device, the implementations of the disclosed technology allow to improve the performance of the electronic device by efficiently using the map caching area.

In accordance with an aspect of the present disclosure, there is provided a storage device including: a nonvolatile storage area configured to store a plurality of map segments including information of one or more map entries representing mapping information between a logical address provided by an external device and a physical address corresponding to the logical address; a volatile storage area configured to temporarily store journal data including information that keeps track of changes to the mapping information to enable for updating the mapping information; and a controller in communication with the nonvolatile storage area and the volatile storage area and configured to count a number of first map segments that store the updated mapping information, and update the mapping information in the nonvolatile storage area according to a ratio of a number of logical addresses included in the journal data and the number of first map segments.

In accordance with another aspect of the present disclosure, there is provided a method of operating a controller, the method including: storing journal data including updated mapping information of a logical address provided by an external device; updating a map segment bitmap table corresponding to a map segment to which the updated mapping information belongs; calculating a ratio of a number of journal entries included in the journal data and a number of dirty map segments; and reading the dirty map segment, based on the ratio.

In accordance with still another aspect of the present disclosure, there is provided an electronic device including: a host including a host memory buffer; and a storage device configured to communicate with the host to store data that includes map segments, each map segment covering a corresponding logical address area provided by the host in the host memory buffer, based on a ratio that indicates a number of the map segments covering the logical address area with respect to a size of the logical address area.

In accordance with still another aspect of the present disclosure, there is provided a storage device including: a nonvolatile memory device configured to store map segments including mapping information between a logical address provided by a host and a physical address; a journal data storage configured to store journal data including updated mapping information of the logical address by the host; a map storage configured to store dirty map segments to be updated based on the journal data; a power providing circuit configured to provide power to the nonvolatile memory device; and a map controller configured to determine a maximum value of a number of dirty map segments to be stored in the map storage, based on a capacity of the power provided by the power providing circuit.

In accordance with still another aspect of the present disclosure, there is provided a method of operating a storage device, the method including: determining a maximum value of a number of dirty map segments to be stored; storing journal data as updated mapping information of a logical address provided by a host; determining dirty map segments to be read; and reading the dirty map segments until the number of dirty map segments becomes equal to the maximum value.

In accordance with still another aspect of the present disclosure, there is provided a controller including: a journal data storage configured to store journal entries to reflect changes in mapping between physical addresses in a memory device for storing data and corresponding logical addresses for the data; a map segment bitmap table representing states of map segments by using a first value and a second value that indicate a set state and a release state, respectively, the map segment bitmap table used to identify first map segments that have the set state and are to be updated based on the journal entries; a map storage configured to store first map segments; and a map controller configured to store the first map segments and a second map segment based on the map segment bitmap table that includes M consecutive number of set states corresponding to the first map segments, wherein the second map segment corresponds to a map segment whose state value appearing next to those of the first map segments in the map segment bitmap table, M being a positive integer.

In accordance with still another aspect of the present disclosure, there is provided a controller including: a journal data storage configured to store a journal entry as updated mapping information of a logical address in response to an update of data corresponding to the logical address, a map storage configured to temporarily store map segments, a bitmap table representing states of map segments to identify first map segments that are to be updated based on the journal entry and a map controller configured to determine whether to store a first map segment based on a ratio of a number of logical addresses included in the journal entry and a number of the first map segments.

The map controller may determine to store the first map segment in the map storage when a number of the journal entries is equal to a number of logical addresses covered by one map segment, and the ratio is equal to or greater than a value obtained by dividing the number of logical addresses covered by the one map segment by 2.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 6 is a diagram illustrating a map segment bitmap table in accordance with an embodiment of the present disclosure.

FIG. 12 is a diagram illustrating a number of required consecutive dirty map segments in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
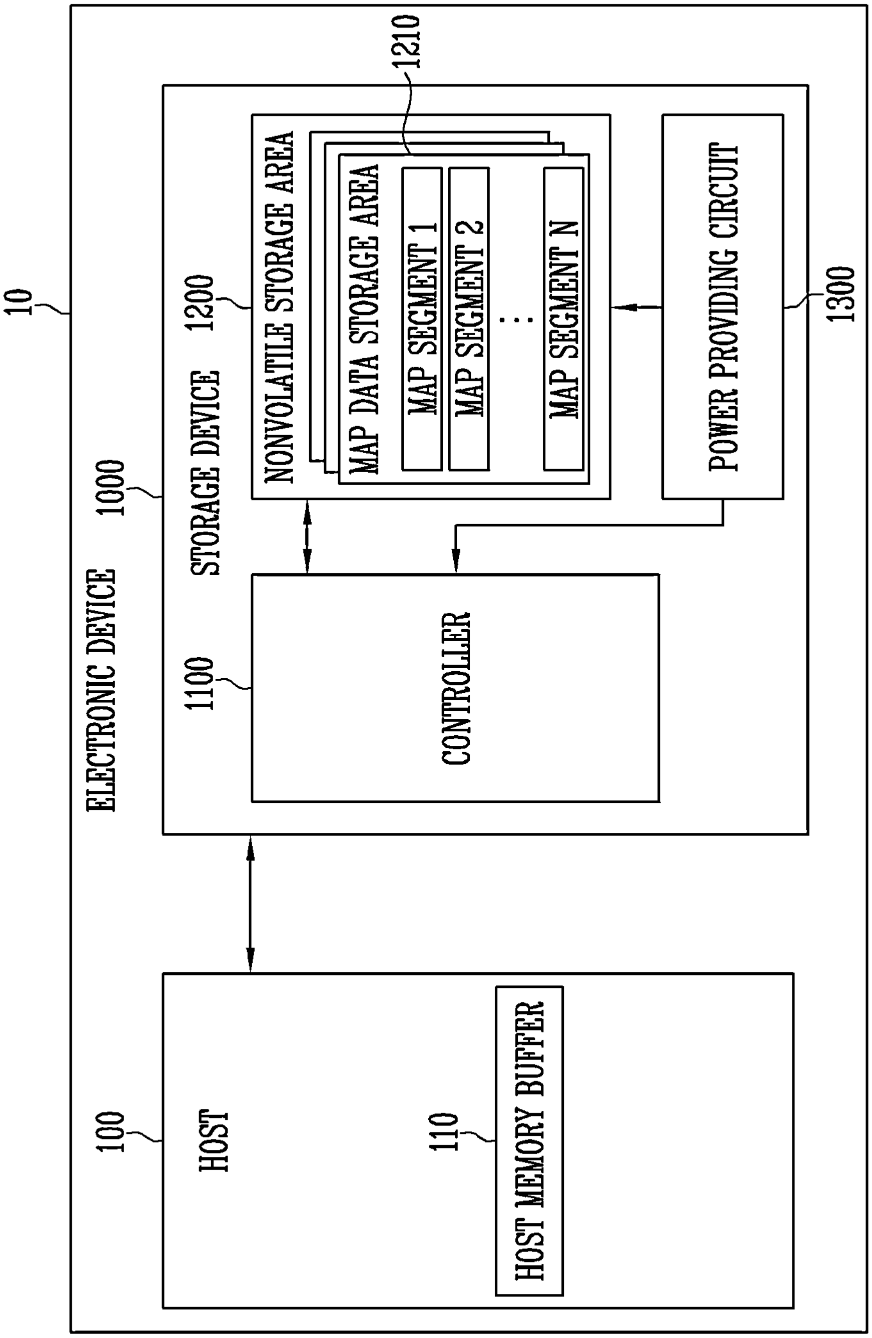
FIG. 1 is a diagram illustrating an electronic device in accordance with an embodiment of the present disclosure.

FIG. 1 is a diagram illustrating an electronic device in accordance with an embodiment of the present disclosure.

Referring to FIG. 1, the electronic device 10 may include a host 100 and a storage device 1000.

The storage device 1000 may include a controller 1100, a nonvolatile storage area 1200, and a power providing circuit 1300.

The storage device 1000 may be connected to the host 100 and operates based on requests for the host 100. The host 100 may include a mobile phone, a smartphone, a laptop computer, a desktop computer, a TV, a game console, a tablet PC, an in-vehicle infotainment system, a drone, an autonomous vehicle, or others. The host 100 may control the storage device 1000, thereby storing data in the nonvolatile storage area 1200.

The storage device 1000 may be manufactured as any one of various types of storage devices according to a host interface that determines a communication scheme with the host 100. For example, the storage device 1000 may be configured as any one of a variety of types of storage devices, such as a Solid State Drive (SSD), a multimedia card in the form of an MMC, an eMMC, an RS-MMC and a micro-MMC, a secure digital card in the form of an SD, a mini-SD and a micro-SD, a Universal Serial Bus (USB) storage device, a Universal Flash Storage (UFS) device, a personal computer memory card international association (PCMCIA) card type storage device, a peripheral component interconnection (PCI) card type storage device, a PCI express (PCI-E) card type storage device, a Compact Flash (CF) card, a Smart Media Card (SMC), or a memory stick.

The storage device 1000 may be manufactured as any one of various package types. For example, the storage device 1000 may be manufactured as any one of various package types such as a Package-On-Package (POP), a System-In-Package (SIP), a System-On-Chip (SOC), a Multi-Chip Package (MCP), a Chip-On-Board (COB), a Wafer-level Fabricated Package (WFP), or a Wafer-level Stack Package (WSP).

The nonvolatile storage area 1200 may be configured to store data. The nonvolatile storage area 1200 is operated based on the control of the controller 1100. The nonvolatile storage area 1200 may include a memory cell array including a plurality of memory cells and each memory cell is configured for storing data. The memory cells in the memory cell array may be organized as a plurality of memory blocks of memory cells. Each memory block may include a plurality of memory cells. One memory block may include a plurality of pages of memory cells. Thus, the nonvolatile storage area 1200 may include a plurality of memory cells for storing data, where the memory cells are organized and grouped to form a plurality of pages of memory cells and the pages of memory cells are organized and grouped to form blocks of memory cells. Each page includes different memory cells and each block includes different pages of memory cells.

In an embodiment, a page of memory cells may be a unit for programming data to the nonvolatile storage area 1200 or reading data stored in the nonvolatile storage area 1200 so that the memory cells in a page can be programmed for read or write together. The memory block may be a unit for erasing data stored in the nonvolatile storage area 1200 so that all memory cells of a block can be erased together.

In an embodiment, the nonvolatile storage area 1200 may be a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or others. In this specification, for convenience of description, a case where the nonvolatile storage area 1200 is a NAND flash memory is assumed and described.

In an embodiment, the nonvolatile storage area 1200 may be implemented in a three-dimensional array structure. The present disclosure may be applied to not only a flash memory device in which a charge storage layer is configured with a conductive floating gate (FG) but also a charge trap flash (CTF) in which a charge storage layer is configured with an insulating layer.

In an embodiment, each of the memory cells included in the nonvolatile storage area 1200 may be configured as a Single Level Cell (SLC) storing one data bit. Also, each of the memory cells included in the nonvolatile storage area 1200 may be configured as a Multi-Level Cell (MLC) storing two data bits, a Triple Level Cell (TLC) storing three data bits, or a Quad Level Cell (QLC) storing four data bits.

In an embodiment, the nonvolatile storage area 1200 may include a map data storage area 1210. The map data storage area 1210 may include a plurality of memory blocks of memory cells for storing map data. The map data may include mapping information between a Logical Block Address (LBA) provided by the host 100 and a Physical Block Address (PBA). The map data storage area 1210 may store the map data in map segments therein by using a map segment as a unit.

The controller 1100 may be in communication with the nonvolatile storage area 1200 and control overall operations of the nonvolatile storage area 1200.

The controller 1100 may be configured to various control functions, some of which may include, or may be divided into, three functional layers. Specifically, the controller 1100 may include a Host Interface Layer (HIL) for managing an interface with the host 100 in connection with the operations of reading or writing data in memory cells in the storage area 1200 of the storage device 1000, a Flash Interface Layer (FIL) for managing an interface with the storage area 1200 of the storage device 1000 which may include a flash memory device, and a Flash Translation layer (FTL) for managing translation between the two layers of HIL and FIL.

When power is applied to the storage device 1000, the controller 1100 may execute firmware (FW). When the nonvolatile storage area 1200 is configured as a flash memory device, the controller 1100 may execute FW such as a Flash Translation Layer (FTL) for controlling communication between the host 100 and the nonvolatile storage area 1200. When power is applied to the storage device 1000, the controller 1100 may read data necessary for booting the storage device 1000 from a ROM (not shown).

In an embodiment, the controller 1100 may receive data and an LBA, which are input from the host 100, and translate the LBA into a PBA representing the addresses of memory cells included in the nonvolatile storage area 1200, in which data is to be stored. In some implementations, the controller 1100 may store, in a buffer memory (not shown), a logical-physical address mapping table representing a mapping relationship between LBAs and PBAs.

The controller 1100 may communicate with the host 100. In an embodiment, the controller 1100 may communicate with the host 100, using at least one of various communication schemes, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), or a Load Reduced DIMM (LRDIMM).

The host 100 may include a host memory buffer 110. The host memory buffer 110 may temporarily store user data. The host memory buffer 110 may store information on the storage device 1000. In an embodiment, the host memory buffer 110 may communicate with the controller 1100, thereby storing map segments. The host 100 may be an external device which provides a request for storing data in the storage device 1000, reading data stored in the storage device 1000, or erasing data stored in the storage device 1000.

The power providing circuit 1300 may provide power to the controller 1100 and the nonvolatile storage area 1200 in response to sudden power off (SPO). The power providing circuit 1300 may include a Tantalum Polymer Solid Capacitor (POSCAP). The power which the power providing circuit 1300 provides to the controller 1100 and the nonvolatile storage area 1200 may vary according to a capacitance of the POSCAP.

Figure 2:
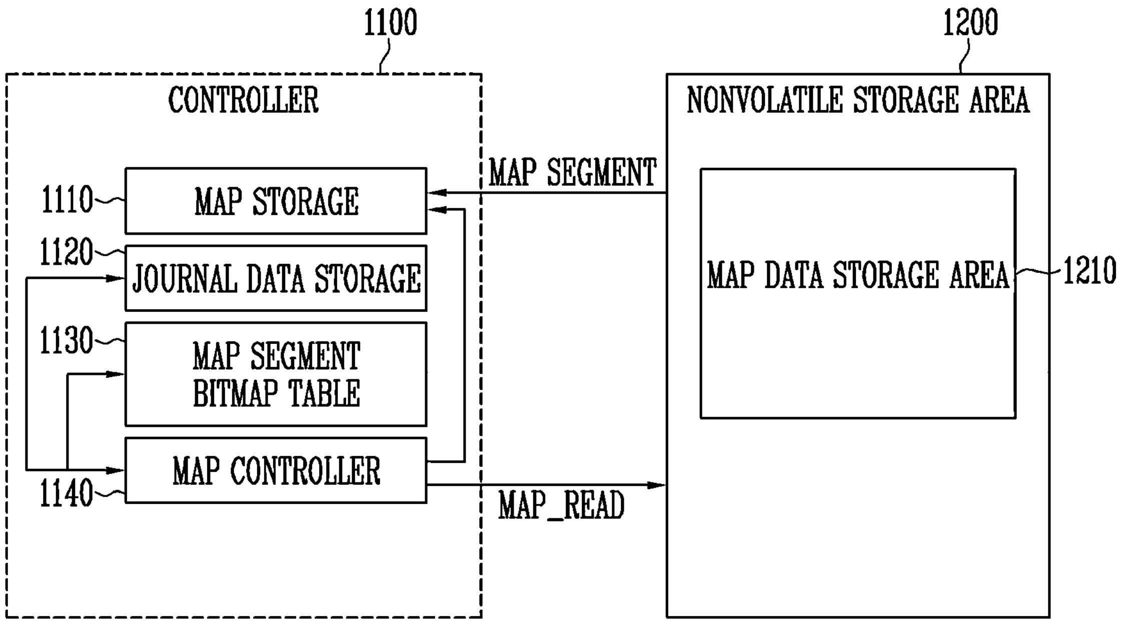
FIG. 2 is a diagram illustrating a controller in accordance with an embodiment of the present disclosure.

FIG. 2 is a diagram illustrating a controller in accordance with an embodiment of the present disclosure.

Referring to FIG. 2, the controller 1100 in the storage device 1000 may include a number of storage units, including a map storage 1110, a journal data storage 1120, a map segment bitmap table 1130, and a map controller 1140.

The controller 1100 may control memory cells in the nonvolatile storage area 1200 in the storage device 1000 to perform a program operation, a read operation, or an erase operation based on a request of the host 100 shown in FIG. 1. In the program operation, the controller 1100 may provide a program command and data to the nonvolatile storage area 1200. In the read operation, the controller 1100 may provide a read command to the nonvolatile storage area 1200. In the erase operation, the controller 1100 may provide an erase command to the nonvolatile storage area 1200.

The nonvolatile storage area 1200 may receive a command and an address from the controller 1100, and access an area selected by the address in the memory cell array. Thus, the nonvolatile storage area 1200 may perform an operation corresponding to the command on the area selected by the address. For example, the nonvolatile storage area 1200 may perform a program (write) operation, a read operation, and an erase operation. In the program operation, the nonvolatile storage area 1200 may program data in the area selected by the address. In the read operation, the nonvolatile storage area 1200 may read data from the area selected by the address. In the erase operation, the nonvolatile storage area 1200 may erase data stored in the area selected by the address.

The map storage 1110 may store map data. The map data may include mapping information between an LBA provided by the host and a PBA. The controller 1100 may translate the LBA into the PBA, based on the map data stored in the map storage 1110.

The map storage 1110 in the controller 1100 may be configured as a volatile memory device. The map storage 1110 may be a Static Random Access Memory (SRAM). The map storage 1110 may store some map segments among a plurality of map segments stored in the map data storage area 1210 of the nonvolatile storage area 1200 as described above with reference to FIG. 2. In an embodiment, the map storage 1110 may store the map data in the unit of a map segment.

The journal data storage 1120 may store journal data for keeping track of or journaling changes in the mapping between the PBAs and LBAs. The journal data may include, for example, updated mapping information of the LBA provided by the host 100 shown in FIG. 1 to reflect changes in the mapping between LBAs and PBAs. When data corresponding to the LBA provided by the host 100 is updated, the journal data stored in the journal data storage 1120 in the controller 1100 may include information on the LBA, a PBA corresponding to the LBA, and an updated PBA.

The map segment bitmap table 1130 in in the controller 1100 may be a set of bitmaps corresponding to each of the map segments stored in the map data storage area 1210 in the nonvolatile storage area 1200 shown in FIG. 2. The map segment bitmap table 1130 may be a set of bitmaps, one bit corresponding to one map segment. For example, when N (N is an arbitrary natural number) map segments are stored in the map data storage area 1210, the map segment bitmap table 1130 may be an N-bit bitmap table. The map segment bitmap table 1130 may be arranged in an order of the LBA.

The map controller 1140 in the controller 1100 may control the map storage 1110, the journal data storage 1120, and the map segment bitmap table 1130 in the controller 1100.

The map controller 1140 may update the map segment bitmap table 1130. In an embodiment, when journal data is stored in the journal data storage 1120, the map controller 1140 may search for a map segment including mapping information on the stored journal data, and update a bitmap corresponding to the searched map segment. In some implementations, when map segments stored in the map storage 1110 are updated based on the journal data stored in the journal data storage 1120, the map controller 1140 may update a bitmap corresponding to the updated map segment.

The map controller 1140 may store map segments in the map storage 1110 by controlling the nonvolatile storage area 1200. The map controller 1140 may provide a map read command MAP_READ to the nonvolatile storage area 1200. In some implementations, the map controller 1140 may store map segments provided by the nonvolatile storage area 1200 in the map storage 1110.

The map controller 1140 may update the map segments stored in the map storage 1110. In some implementations, the map controller 1140 may reflect updated mapping information between the LBA and the PBA on the map segments stored in the map storage 1110, based on the journal data stored in the journal data storage 1120.

The map controller 1140 may determine map segments to be stored in the map storage 1110 among the map segments received from the nonvolatile storage area 1200.

The map controller 1140 may determine a maximum value of the number of map segments which can be stored based on the capacity of the power providing circuit 1300 shown in FIG. 1. The map controller 1140 may determine, as the maximum value, a maximum number of map segments which can be stored in the nonvolatile storage area 1200 in response to sudden power off. The maximum value may be determined by a capacitance of the power providing circuit 1300 shown in FIG. 1. The map controller 1140 may read "dirty" map segments from the nonvolatile storage area 1200 until the number of map segments stored in the map storage 1110 becomes equal to the maximum value, where the dirty map segments may correspond to map segments to be updated as further discussed later in this patent document.

The map storage 1110, the journal data storage 1120, and the map segment bitmap table 1130 may be included in a volatile storage area. In an embodiment, the volatile storage area may be integrated with a memory controller to form one chip.

Figure 3:
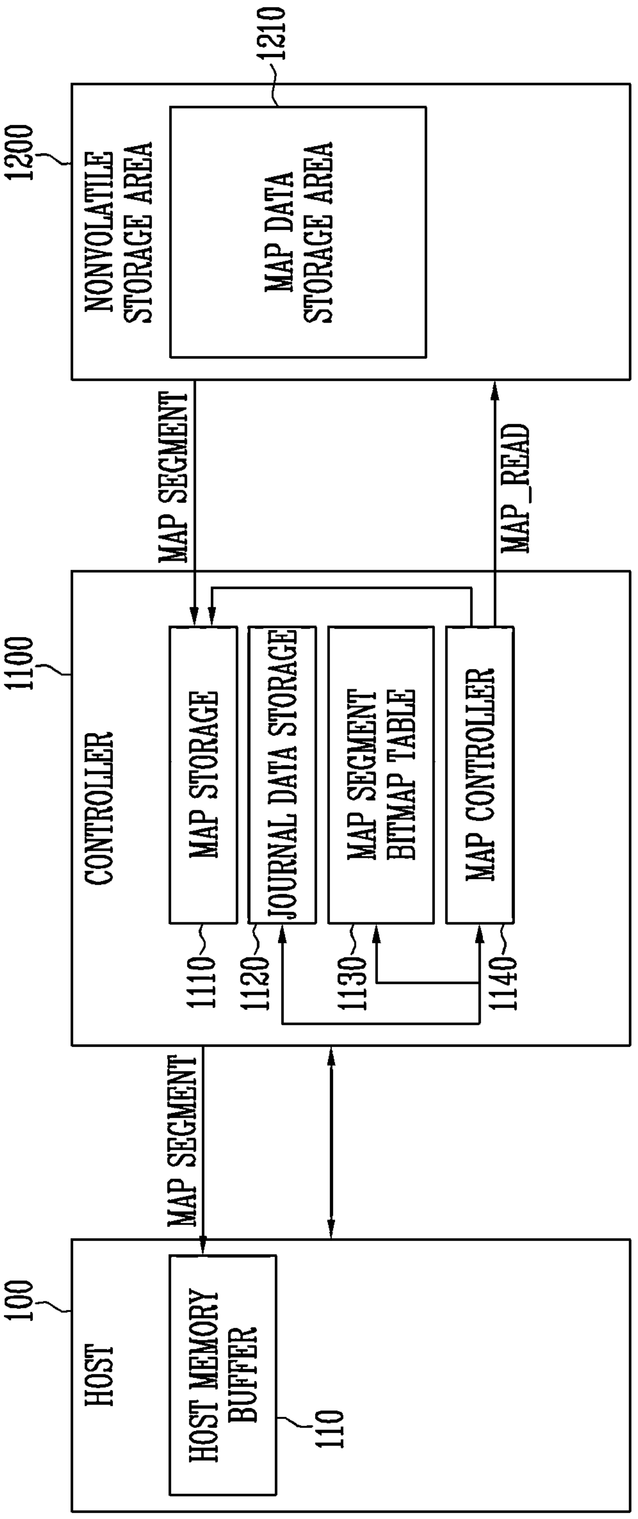
FIG. 3 is a diagram illustrating an operation of the electronic device in accordance with an embodiment of the present disclosure.

FIG. 3 is a diagram illustrating an operation of the electronic device in accordance with an embodiment of the present disclosure.

Referring to FIG. 3, the controller 1100 may store map segments in the host memory buffer 110.

The controller 1100 may store map segments in the host memory buffer 110. The map controller 1140 may determine map segments to be stored in the host memory buffer 110 among map segments received from the nonvolatile storage area 1200. After that, the controller 1100 may communicate with the host 100 to store the map segments in the host memory buffer 110.

A process in which the controller 1100 determines map segments to be provided to the host memory buffer 110 will be described later with reference to FIG. 16.

Figure 4:
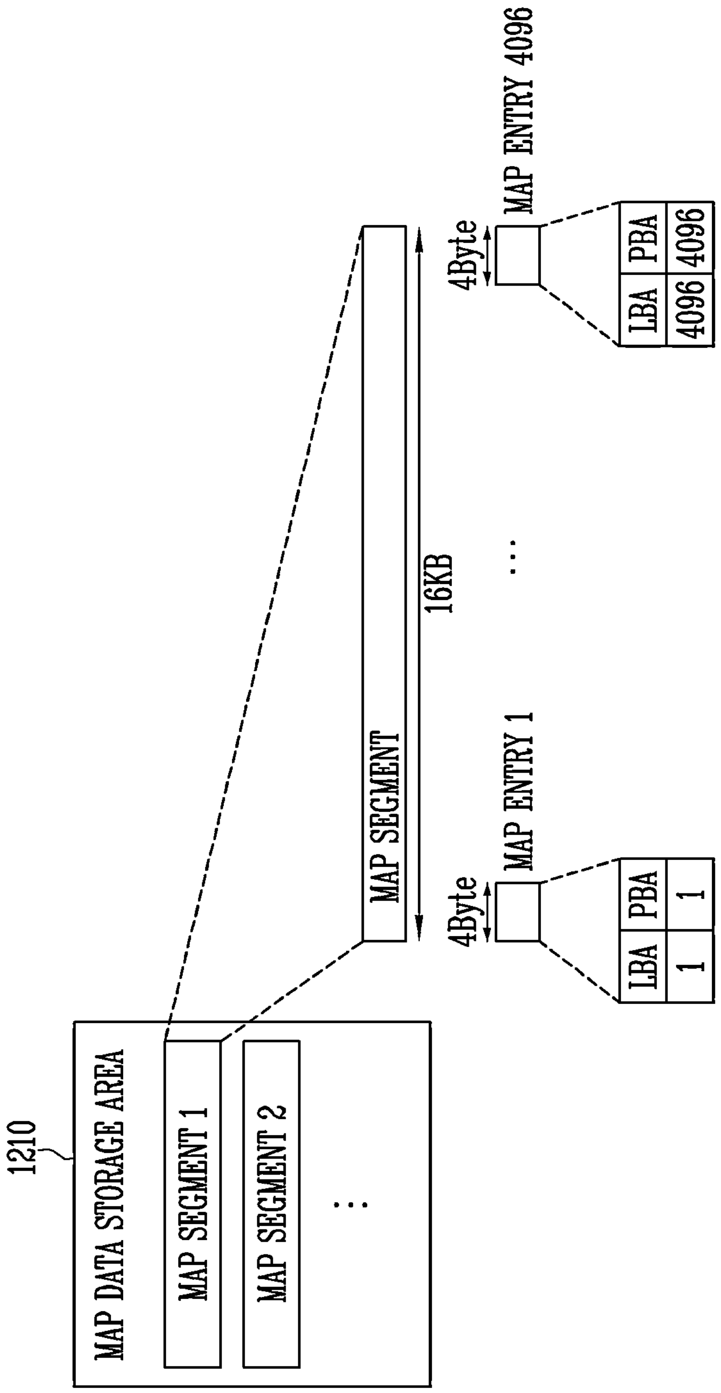
FIG. 4 is a diagram illustrating a map segment in accordance with an embodiment of the present disclosure.

FIG. 4 is a diagram illustrating the structure of a map segment stored in the map data storage area 1210 of the nonvolatile storage area 1200 in accordance with an embodiment of the present disclosure.

Referring to FIG. 4, the map data storage area 1210 may store a plurality of map segments within the nonvolatile storage area 1200.

One map segment may be stored in a storage area corresponding to one page of memory cells in the map data storage area 1210 for storing mapping information between an LBA and a PBA. For example, as illustrated in in FIG. 4, map segment 1 may be stored in one page of memory cells in which mapping information is stored. Similarly, map segment 2 may be stored in one page in which mapping information are stored.

One map segment may correspond to data for mapping information stored in one page of memory cells. Therefore, in some implementations, the one map segment may have a size of 16 KB. In the example illustrated in FIG. 4, each of the map segment 1 and the map segment 2 may be a page having a size of 16 KB.

One part of the mapping information between an LBA and a PBA may be a map entry. For example, map entry 1 may include mapping information between LBA 1 and PBA 1. Similarly, map entry 4096 may include mapping information between LBA 4096 and PBA 4096.

One map entry may have a size of 4 bytes in some implementations. For example, the map entry 1 may have a size of 4 bytes. Similarly, the map entry 4096 may have a size of 4 bytes. Therefore, one map segment may include 4096 map entries.

One map segment may include a set of a plurality of map entries. For example, when assuming that the map segment 1 includes a map entry for a lowest LBA, the map segment 1 may include map entries corresponding to the LBA 1 to the LBA 4096. Similarly, the map segment 2 may include map entries corresponding to LBA 4097 to LBA 8192.

In some implementations, map entries included in one map segment may be arranged in an ascending order of LBAs. For example, the map segment 1 may include map entries arranged in an ascending order from the map entry 1 corresponding to the LBA1 to the map entry 4096 corresponding to the LBA 4096.

Similarly, the map segment 2 may include map entries arranged in an ascending order from map entry 4097 corresponding to the LBA 4097 to map entry 8192 corresponding to the LBA 8192.

The size of one map segment and the size of one map entry are merely illustrative, and the present disclosure is not limited to this embodiment.

Figure 5:
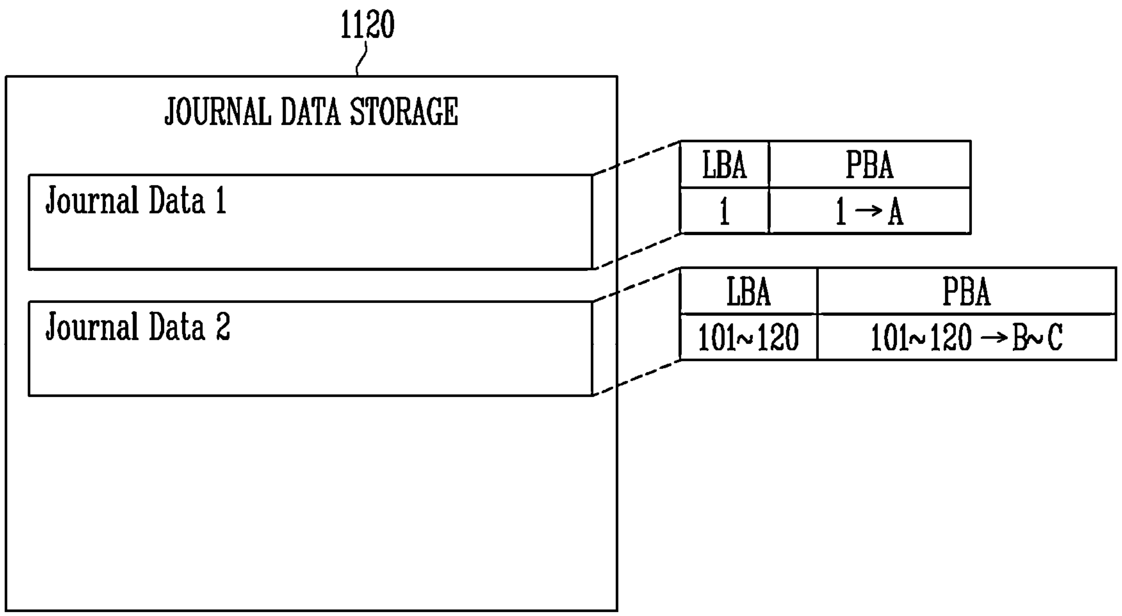
FIG. 5 is a diagram illustrating a journal data storage in accordance with an embodiment of the present disclosure.

FIG. 5 is a diagram illustrating a journal data storage stored in the journal data storage 1120 within the controller 1100 in accordance with an embodiment of the present disclosure.

Referring to FIG. 5, the journal data storage 1120 may store journal data 1 and journal data 2 in the illustrated example.

When the controller 1100 receives a write request from the host to program data in an area corresponding to the LBA after certain data has been already stored according to a previous write request in a PBA corresponding to the LBA, the controller 1100 may store the data in a changed PBA. In the implementations, the journal data may include information on the LBA and the changed information including a PBA corresponding to a LBA, and a new PBA area (i.e., the changed PBA).

For example, as shown in FIG. 5, the illustrated Journal Data 1 may include information on a changed PBA from “PBA 1” to “PBA A” that maps to the same corresponding LBA 1.

In response to a write request from the host 100, the controller 1100 shown in FIG. 1 may store data provided by the host 100 in a PBA area corresponding to a LBA provided by the host 100. Also, when the controller 1100 receives a write request to additionally program the same LBA using data to be programmed, the controller 1100 may store the data to be programed in a new PBA area “PBA A” instead of the prior PBA area “PBA 1” corresponding to the existing LBA based on the updated mapping in Journal Data 1 for LBA 1.

Specifically, when the controller 1100 receives a write request including data to be programmed in an area corresponding to the LBA 1, the controller 1100 may store the data in an area corresponding to PBA A instead of PBA 1.

Similarly, when the controller 1100 receives a write request including data to be programmed in areas corresponding to LBA 101 to LBA 120, the controller 1100 may store the data in areas corresponding to PBA B to PBA C based on the updated mapping for LBA 101 to LBA 120 in the Journal Data 2.

The map controller 1140 shown in FIG. 2 may store data in the nonvolatile storage area 1200 in response to a write request provided by the host 100 and then store, in the journal data storage 1120, journal data including an LBA received from the host 100 and a PBA at which the data is recorded.

The journal data storage 1120 may store journal data by using a journal entry as a unit for storing the change information associated with one LBA. The journal entry may include change information on one LBA and a PBA at which data corresponding to the one LBA is stored.

In an embodiment, the journal data 1 may include one journal entry including the LBA 1 and change information of a PBA (PBA 1→PBA A).

In an embodiment, the journal data 2 may include 20 journal entries including the LBA 101 to LBA 120 and change information of PBAS corresponding thereto (PBA 101 to PBA 120→PBA B to PBA C).

FIG. 6 is a diagram illustrating a map segment bitmap table in accordance with an embodiment of the present disclosure.

Referring to FIG. 6, the map segment bitmap table 1130 may include bitmaps respectively corresponding to map segments.

Hereinafter, for convenience of description, it is assumed that one map segment includes 100 map entries. For example, map segment 1 may include map entries corresponding to LBA 1 to LBA 100. Map segment 2 may include map entries corresponding to LBA 101 to LBA 200. Map segment 3 may include map entries corresponding to LBA 201 to LBA 300. However, the present disclosure is not limited to this embodiment, and the number of map entries included in one map segment may vary.

The map segment bitmap table 1130 may include bitmaps respectively corresponding to map segments stored in the nonvolatile storage area. The map segment bitmap table 1130 may include a map segment number and LBAs corresponding to map entries included in a corresponding map segment. As described above with reference to FIG. 4, map entries included in each map segment are arranged in an ascending order of LBAs, and therefore, the map segment bitmap table 1130 may also be aligned in an ascending order of LBAs.

For example, the map segment bitmap table 1130 may include a 1-bit bitmap corresponding to map segment 1, a 1-bit bitmap corresponding to map segment number 2, a 1-bit bitmap corresponding to map segment number 3, a 1-bit bitmap corresponding to map segment number 4, and a 1-bit bitmap corresponding to map segment number 5.

The map segment bitmap table 1130 may include information on LBAs of map entries included in each map segment. For example, the map segment bitmap table 1130 may include information on LBAs LBA 1 to LBA 100 corresponding to map entries included in the map segment 1, LBAs LBA 101 to LBA 200 corresponding to map entries included in the map segment number 2, LBAs LBA 201 to LBA 300 corresponding to map entries included in the map segment number 3, LBAs LBA 301 to LBA 400 corresponding to map entries included in the map segment number 4, and LBAS LBA 401 to LBA 500 corresponding to map entries included in the map segment number 5.

A 1-bit bitmap corresponding to each map segment may represent a set state (e.g., bit '1') or a release state (e.g., bit '0'). A map segment corresponding to the set state may be referred to as a "dirty" map segment. A map segment corresponding to the release state may be referred to as a clean map segment. The map segment having the set state (dirty map segment) may correspond to a map segment which is to be updated based on the journal data stored in the journal data storage 1120 shown in FIG. 5. The map segment in the release state (clean map segment) may correspond to a map segment which has been updated based on the journal data stored in the journal data storage 1120 shown in FIG. 5. Alternatively, the map segment in the release state (clean map segment) may correspond to a map segment for which no update is needed.

For example, as shown in FIG. 5, it is assumed that data corresponding to the LBA 1 is stored in a PBA A area. The map segment 1 including map entry 1 corresponding to the LBA 1 has not been updated based on the journal data 1, and therefore, the map entry 1 included in the map segment 1 may include logical-physical block address mapping information corresponding to LBA 1-PBA 1. The bitmap corresponding to the map segment 1 may represent '1.' The map segment 1 may be in the set state. The map segment 1 may be a map segment which is to be updated based on the journal data 1.

Similarly, as shown in FIG. 5, it is assumed that data corresponding to LBA 101 to LBA 120 is stored in an area corresponding to PBA B to PBA C. The map segment 2 including map entries (map entry 101 to map entry 120) corresponding to LBA 101 to LBA 120 has not been updated based on the journal data 2, and therefore, the map entries (map entry 101 to map entry 120) included in the map segment 2 may include logical-physical address mapping information corresponding to LBA 101-PBA 101 to LBA 120-PBA 120. The bitmap corresponding to the map segment number 2 may represent '1.' The map segment 2 may be in the set state. The map segment 2 may be a map segment which is to be updated based on the journal data 2.

Referring to FIG. 6, the bitmaps corresponding to the map segment number 3 to the map segment number 5 may all represent '0.' In an embodiment, the map segment number 3 to the map segment number 5 may be in the release state. Therefore, the map segment number 3 to the map segment number 5 may be map segments which have already updated based on the journal data stored in the journal data storage 1120. Alternatively, the map segment number 3 to the map segment number 5 may be map segments which are unnecessary to be updated as no LBA is received from the host 100 shown in FIG. 1.

Figure 7:
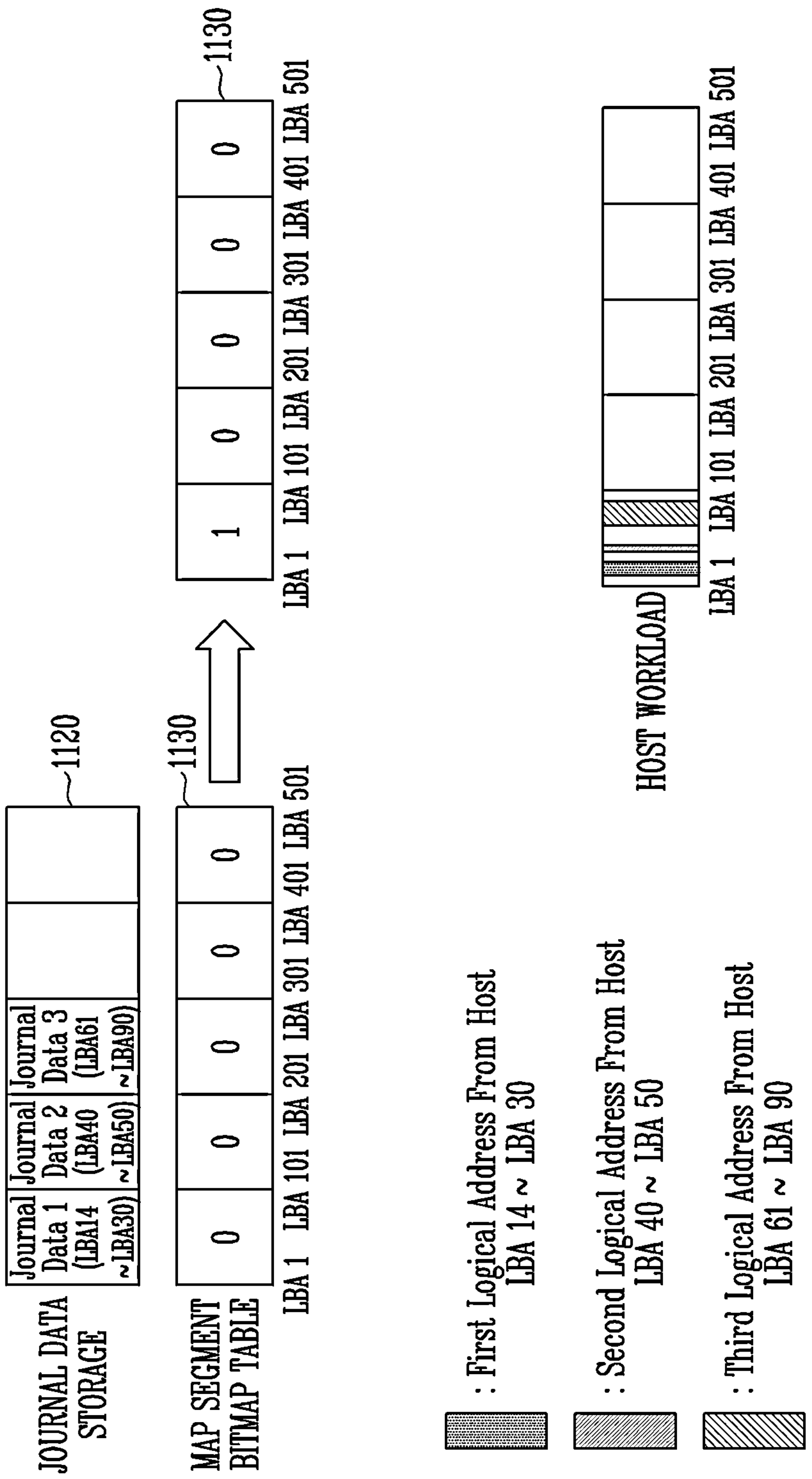
FIG. 7 is a diagram illustrating an operation of updating the map segment bitmap table in accordance with an embodiment of the present disclosure.

FIG. 7 is a diagram illustrating an operation of updating the map segment bitmap table in accordance with an embodiment of the present disclosure.

Referring to FIG. 7, the map controller 1140 shown in FIG. 2 may update the map segment bitmap table 1130 whenever journal data is stored in the journal data storage 1120.

For convenience of description, it is assumed that no map segment is stored in the map storage (not shown).

As shown in FIG. 7, it is assumed that the host provides a write request to a PBA area corresponding to LBA area 1 (LBA 14 to LBA 30), provides a write request in a PBA area corresponding to LBA area 2 (LBA 41 to LBA 50), and provides a write request to a PBA area corresponding to LBA area 3 (LBA 61 to LBA 90).

The controller 1100 shown in FIG. 2 may store data in a PBA area corresponding to an LBA provided by the host in response to a write request provided by the host. After that, the map controller 1140 may store, in the journal data storage 1120, journal data as information on an LBA and a changed PBA corresponding thereto.

In an embodiment, when data is stored in the PBA area corresponding to the LBA area 1, the map controller 1140 may store journal data 1 in the journal data storage 1120. The journal data 1 may include a plurality of journal entries. For example, the journal data 1 may include journal entries as change information of PBAs respectively corresponding to LBA 14 to LBA 30.

Any map segments are not currently stored in the map storage (not shown), and therefore, a map segment including mapping information on an LBA corresponding to the journal entries included in the journal data 1 is to be stored in the map storage 1110 so as to reflect the journal data 1 including updated mapping information on the map segment. Map segment 1 including mapping information on LBA 14 to LBA 30 may be a dirty map segment.

The map controller 1140 may check an LBA included in journal data stored in the journal data storage 1120. The map controller 1140 may acquire a map segment number including mapping information on the checked LBA, based on the map segment bitmap table 1130. The map controller 1140 may update a bit map to be in the set state, based on the acquired map segment number.

In an embodiment, the map controller 1140 may check LBAs LBA 14 to LBA 30, which are included in the journal data 1 stored in the journal data storage 1120. The map controller 1140 may acquire a map segment number including mapping information on the checked LBAs LBA 14 to LBA 30, based on the map segment bitmap table 1130. The map controller 1140 may acquire map segment 1, based on the map segment bitmap table 1130 shown in FIG. 5. The map controller 1140 may update a bitmap corresponding to the map segment 1 to be in the set state. The bitmap corresponding to the map segment 1 may be bit '1.'

In an embodiment, when data is stored in the PBA area corresponding to the LBA area 2 provided by the host, the map controller 1140 may store journal data 2 in the journal data storage 1120. The journal data 2 may include a plurality of journal entries. For example, the journal data 2 may include journal entries as change information of PBAs respectively corresponding to LBA 41 to LBA 50.

Any map segments are not currently stored in the map storage (not shown), and therefore, a map segment including mapping information on an LBA corresponding to the journal entries included in the journal data 2 is to be stored in the map storage 1110 so as to reflect the journal data 2 including updated mapping information on the map segment. The map segment 1 including mapping information on LBA 41 to LBA 50 may be a dirty map segment.

The map controller 1140 may check LBA 41 to LBA 50, which are included in the journal data 2 stored in the journal data storage 1120. The map controller 1140 may acquire a map segment number including mapping information on the checked LBAs LBA 41 to LBA 50, based on the map segment bitmap table 1130. The map controller 1140 may acquire the map segment 1, based on the map segment bitmap table 1130 shown in FIG. 5.

In the example, the bitmap corresponding to the map segment 1 has already the set state as bit '1,' and therefore, the map controller 1140 may skip updating the bitmap corresponding to the map segment 1 without repetitively updating the bitmap corresponding to the map segment 1.

In an embodiment, when data is stored in the PBA area corresponding to the LBA area 3 provided by the host, the map controller 1140 may store journal data 3 in the journal data storage 1120. The journal data 3 may include a plurality of journal entries. For example, the journal data 3 may include journal entries as change information of PBAs respectively corresponding to LBA 61 to LBA 90.

The map controller 1140 may check LBA 61 to LBA 90, which are included in the journal data 3 stored in the journal data storage 1120. The map controller 1140 may acquire a map segment number including mapping information on the checked LBAs LBA 61 to LBA 90, based on the map segment bitmap table 1130. The map controller 1140 may acquire the map segment 1, based on the map segment bitmap table 1130 shown in FIG. 5.

Similarly, the bitmap corresponding to the map segment 1 has already represented the set state as bit '1,' and therefore, the map controller 1140 may skip updating the bitmap corresponding to the map segment 1 without repetitively updating the bitmap corresponding to the map segment 1.

Figure 8:
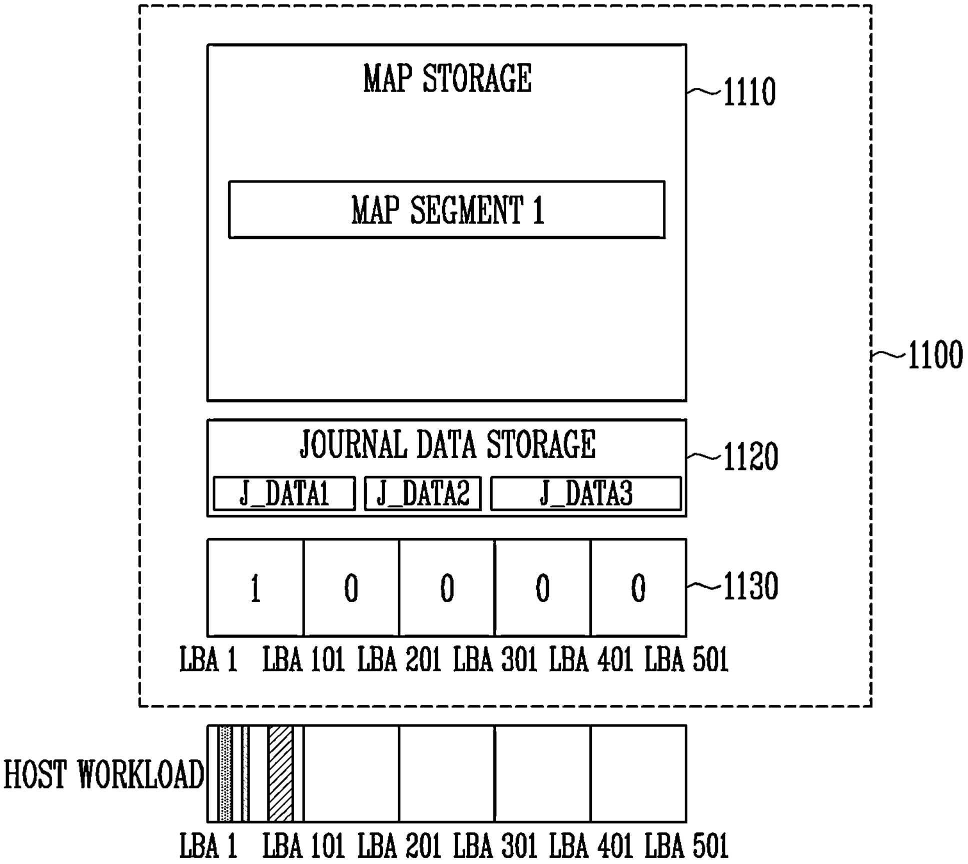
FIG. 8 is a diagram illustrating a controller having a map segment stored therein in accordance with an embodiment of the present disclosure.

FIG. 8 is a diagram illustrating a controller having a map segment stored therein in accordance with an embodiment of the present disclosure.

Referring to FIG. 8, the map controller (not shown) may store map segment 1 in the map storage 1110. The journal data storage 1120 may store the journal data 1 to the journal data 3, which are shown in FIG. 7. As described above with reference to FIG. 7, the bitmap corresponding to the map segment 1 stored in in the map segment bitmap table 1130 may be in the set state.

In an example, it is assumed that the map storage 1110 can store two map segments.

The map controller (not shown) may provide a map read command MAP_READ to the nonvolatile storage area (not shown) so as to store a map segment in the map storage 1110. The nonvolatile storage area (not shown) may provide a corresponding map segment to the controller 1100 in response to the map read command MAP_READ. The map controller (not shown) may store the received map segment in the map storage 1110.

In an embodiment, the map controller (not shown) may provide the map read command MAP_READ to the nonvolatile storage area (not shown), and store the received map segment 1 in the map storage 1110.

As described above with reference to FIG. 7, in an embodiment, an LBA area provided by the host may be or include the LBA area 1 (LBA 14 to LBA 30), the LBA area 2 (LBA 41 to LBA 50), and the LBA area 3 (LBA 61 to LBA 90). Referring back to FIG. 8, a host workload is illustrated, in which an LBA area provided by the host is divided into 100 LBA units.

The size of the LBA area provided by the host may be based on the number of LBAs provided by the host. In an embodiment, the size of the LBA area 1 provided by the host may correspond to 17 LBAs. The size of the LBA area 2 provided by the host may correspond to 10 LBAs. The size of the LBA area 3 provided by the host may correspond to 30 LBAs. In FIG. 8, the host workload corresponding to the LAB area 1, LBA area 2, and LBA area 3 are marked in the LAB area corresponding to the map segment 1 (LAB 1 to LAB 100).

The map segment 1 stored in the map storage 1110 may cover an LBA area (LBA 1 to LBA 100). Therefore, the map controller (not shown) may store only the map segment 1 in the map storage 1110, and update the map segment 1 stored in the map storage 1110, based on the journal data 1 to the journal data 3 (J_DATA1 to J_DATA3). The LBA area 1 to the LBA area 3, which are provided by the host, are all included in the LBA area (LBA 1 to LBA 100), and therefore, the map controller (not shown) may reflect the journal data stored in the journal data storage 1120 on the map segment 1, based on only the map segment 1.

Figure 9:
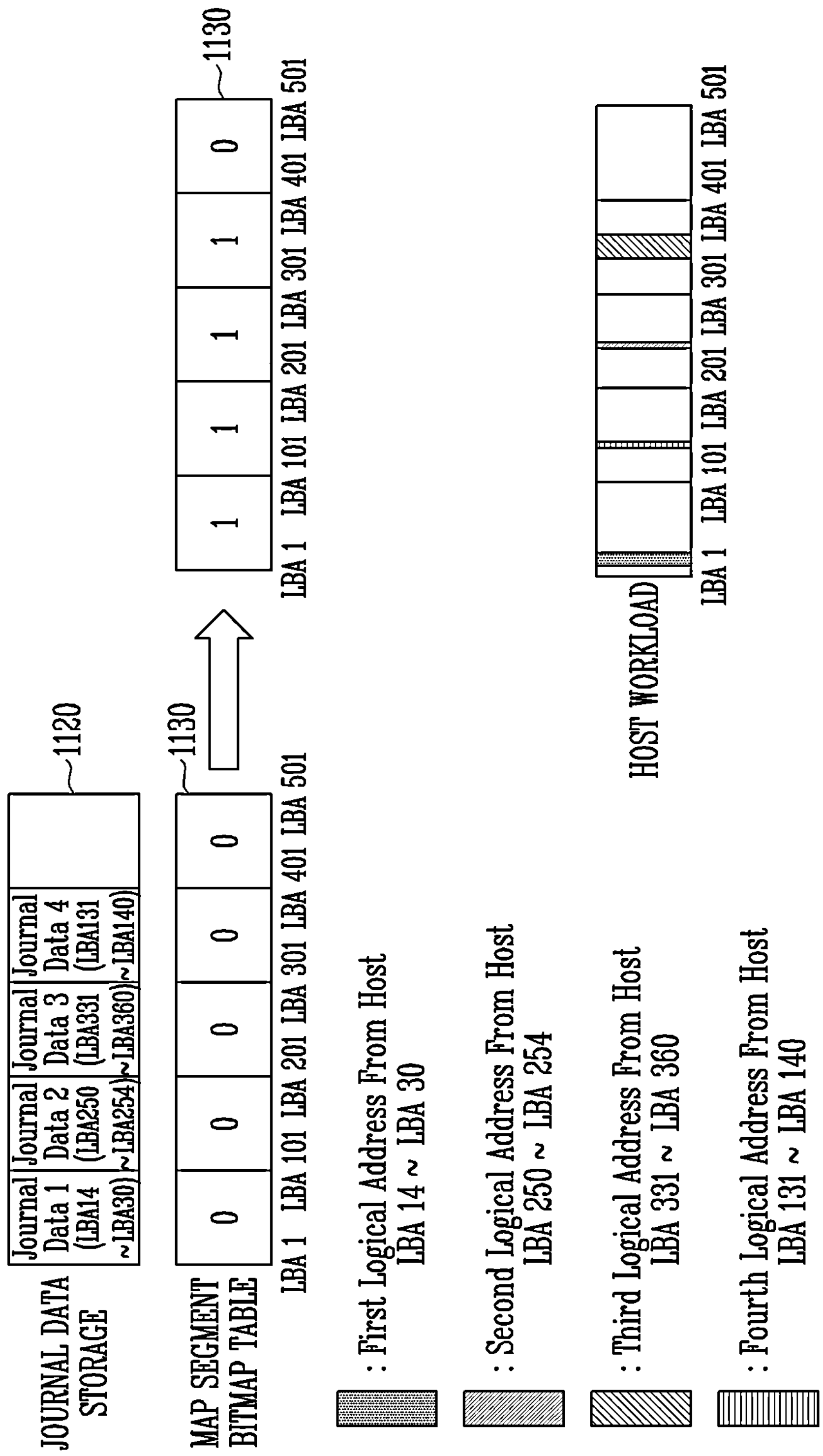
FIG. 9 is a diagram illustrating an operation of updating the map segment bitmap table in accordance with another embodiment of the present disclosure.

FIG. 9 is a diagram illustrating an operation of updating the map segment bitmap table in accordance with another embodiment of the present disclosure.

Referring to FIG. 9, the map controller 1140 shown in FIG. 2 may update the map segment bitmap table 1130 whenever journal data is stored in the journal data storage 1120.

For convenience of description, it is assumed that no map segment is stored in the map storage (not shown).

As shown in FIG. 9, it is assumed that the host provides a write request to a PBA area corresponding to LBA area 1 (LBA 14 to LBA 30), provides a write request in a PBA area corresponding to LBA area 2 (LBA 250 to LBA 254), provides a write request to a PBA area corresponding to LBA area 3 (LBA 331 to LBA 360), and provides a write request to a PBA area corresponding to LBA area 4 (LBA 131 to LBA 140).

The controller 1100 shown in FIG. 2 may store data in a PBA area corresponding to an LBA provided by the host in response to a write request provided by the host. After that, the map controller 1140 may store, in the journal data storage 1120, journal data as information on an LBA and a changed PBA corresponding thereto.

In an embodiment, when data is stored in the PBA area corresponding to the LBA area 1, the map controller 1140 may store journal data 1 in the journal data storage 1120. The journal data 1 may include a plurality of journal entries. For example, the journal data 1 may include journal entries as change information of PBAs respectively corresponding to LBA 14 to LBA 30.

Any map segments are not currently stored in the map storage (not shown), and therefore, a map segment including mapping information on an LBA corresponding to the journal entries included in the journal data 1 is to be stored in the map storage 1110 so as to reflect the journal data 1 including updated mapping information on the map segment. Map segment 1 including mapping information on LBA 14 to LBA 30 may be a dirty map segment.

The map controller 1140 may check an LBA included in journal data stored in the journal data storage 1120. The map controller 1140 may acquire a map segment number including mapping information on the checked LBA, based on the map segment bitmap table 1130. The map controller 1140 may update a bit map to be in the set state, based on the acquired map segment number.

In an embodiment, the map controller 1140 may check LBAs LBA 14 to LBA 30, which are included in the journal data 1 stored in the journal data storage 1120. The map controller 1140 may acquire a map segment number including mapping information on the checked LBAs LBA 14 to LBA 30, based on the map segment bitmap table 1130. The map controller 1140 may acquire map segment 1, based on the map segment bitmap table 1130 shown in FIG. 5. The map controller 1140 may update a bitmap corresponding to the map segment 1 to be in the set state. The bitmap corresponding to the map segment 1 may be bit '1.'

In an embodiment, when data is stored in the PBA area corresponding to the LBA area 2 provided by the host, the map controller 1140 may store journal data 2 in the journal data storage 1120. The journal data 2 may include a plurality of journal entries. For example, the journal data 2 may include journal entries as change information of PBAs respectively corresponding to LBA 250 to LBA 254.

Any map segments are not currently stored in the map storage (not shown), and therefore, a map segment including mapping information on an LBA corresponding to the journal entries included in the journal data 2 is to be stored in the map storage 1110 so as to reflect the journal data 2 including updated mapping information on the map segment. Map segment 3 including mapping information on LBA 250 to LBA 254 may be a dirty map segment.

In an embodiment, the map controller 1140 may check LBAs LBA 250 to LBA 254, which are included in the journal data 2 stored in the journal data storage 1120. The map controller 1140 may acquire a map segment number including mapping information on the checked LBAs LBA 250 to LBA 254, based on the map segment bitmap table 1130. The map controller 1140 may acquire map segment number 3, based on the map segment bitmap table 1130 shown in FIG. 5. The map controller 1140 may update a bitmap corresponding to the map segment number 3 to be in the set state. The bitmap corresponding to the map segment number 3 may be bit '1.'

In an embodiment, when data is stored in the PBA area corresponding to the LBA area 3 provided by the host, the map controller 1140 may store journal data 3 in the journal data storage 1120. The journal data 3 may include a plurality of journal entries. For example, the journal data 3 may include journal entries as change information of PBAs respectively corresponding to LBA 331 to LBA 360.

Any map segments are not currently stored in the map storage (not shown), and therefore, a map segment including mapping information on an LBA corresponding to the journal entries included in the journal data 3 is to be stored in the map storage 1110 so as to reflect the journal data 3 including updated mapping information on the map segment. Map segment 4 including mapping information on LBA 331 to LBA 360 may be a dirty map segment.

In an embodiment, the map controller 1140 may check LBAs LBA 331 to LBA 360, which are included in the journal data 3 stored in the journal data storage 1120. The map controller 1140 may acquire a map segment number including mapping information on the checked LBAs LBA 331 to LBA 360, based on the map segment bitmap table 1130. The map controller 1140 may acquire map segment number 4, based on the map segment bitmap table 1130 shown in FIG. 5. The map controller 1140 may update a bitmap corresponding to the map segment number 4 to be in the set state. The bitmap corresponding to the map segment number 4 may be bit '1.'

In an embodiment, when data is stored in the PBA area corresponding to the LBA area 4 provided by the host, the map controller 1140 may store journal data 4 in the journal data storage 1120. The journal data 4 may include a plurality of journal entries. For example, the journal data 4 may include journal entries as change information of PBAs respectively corresponding to LBA 131 to LBA 140.

Any map segments are not currently stored in the map storage (not shown), and therefore, a map segment including mapping information on an LBA corresponding to the journal entries included in the journal data 4 is to be stored in the map storage 1110 so as to reflect the journal data 4 including updated mapping information on the map segment. Map segment 2 including mapping information on LBA 131 to LBA 140 may be a dirty map segment.

In an embodiment, the map controller 1140 may check LBAs LBA 131 to LBA 140, which are included in the journal data 4 stored in the journal data storage 1120. The map controller 1140 may acquire a map segment number including mapping information on the checked LBAs LBA 131 to LBA 140, based on the map segment bitmap table 1130. The map controller 1140 may acquire map segment number 2, based on the map segment bitmap table 1130 shown in FIG. 5. The map controller 1140 may update a bitmap corresponding to the map segment number 2 to be in the set state. The bitmap corresponding to the map segment number 2 may be bit '1.'

Figure 10:
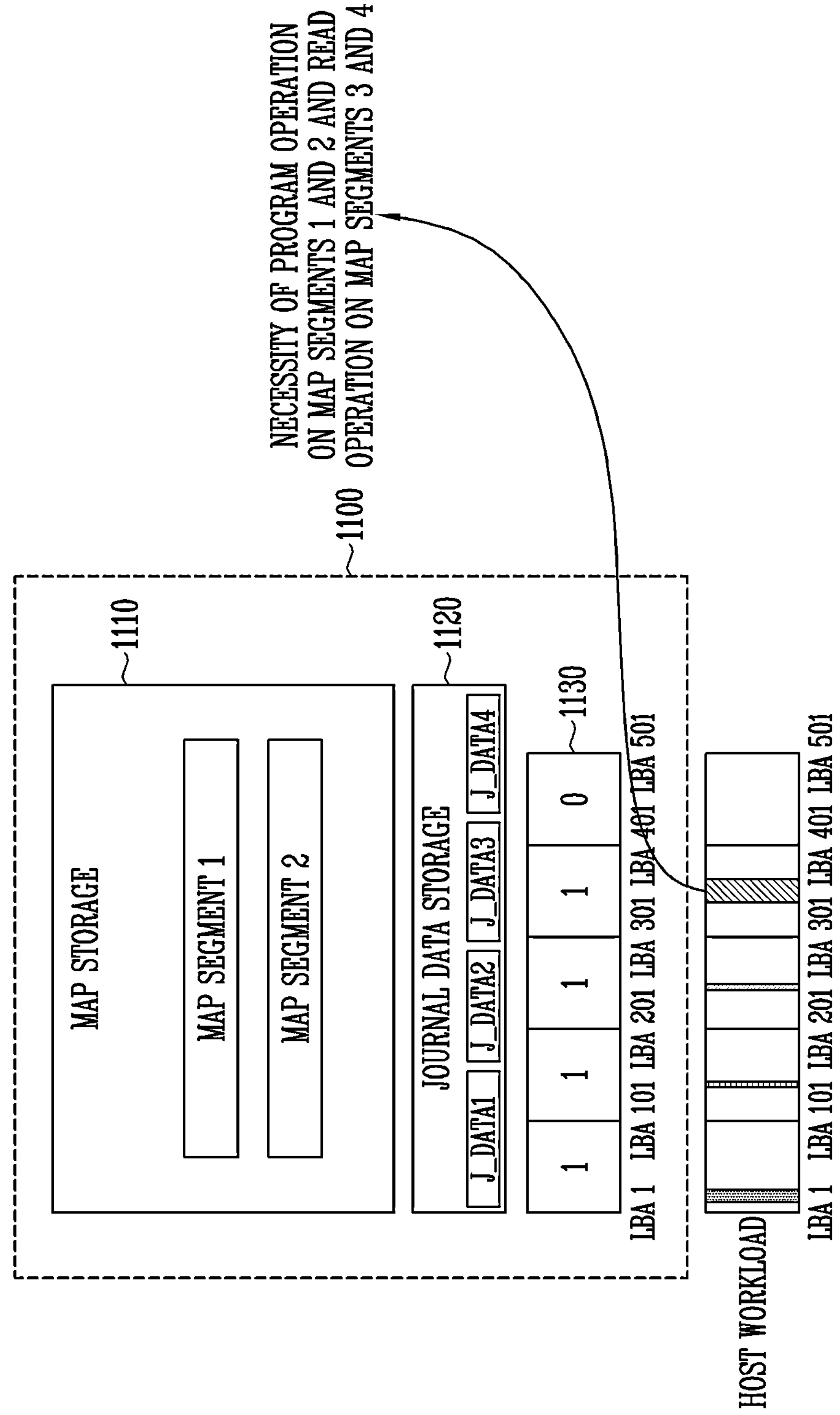
FIG. 10 is a diagram illustrating a controller having map segments stored therein in accordance with another embodiment of the present disclosure.

FIG. 10 is a diagram illustrating a controller having map segments stored therein in accordance with another embodiment of the present disclosure.

Referring to FIG. 10, the map controller (not shown) may store map segment 1 and map segment 2 in the map storage 1110. The journal data storage 1120 may store the journal data 1 to the journal data 4, which are shown in FIG. 9. As described above with reference to FIG. 9, the bitmaps corresponding to the map segment 1, the map segment number 2, the map segment number 3, and the map segment number 4 in the map segment bitmap table 1130 may be in the set state.

In an example, it is assumed that the map storage 1110 can store two map segments.

The map controller (not shown) may provide a map read command MAP_READ to the nonvolatile storage area (not shown) so as to store a map segment in the map storage 1110. The nonvolatile storage area (not shown) may provide a corresponding map segment to the controller 1100 in response to the map read command MAP_READ. The map controller (not shown) may store the received map segment in the map storage 1110.

In an embodiment, the map controller (not shown) may provide the map read command MAP_READ to the nonvolatile storage area (not shown), and store the received map segment 1 and the received map segment 2 in the map storage 1110.

As described above with reference to FIG. 9, in an embodiment, an LBA area provided by the host may be the LBA area 1 (LBA 14 to LBA 30), the LBA area 2 (LBA 250 to LBA 254), the LBA area 3 (LBA 331 to LBA 360), and the LBA area 4 (LBA 131 to LBA 140. Referring back to FIG. 10, a host workload is illustrated, in which an LBA area provided by the host is divided into 100 LBA units.

The map segment 1 stored in the map storage 1110 may cover an LBA area (LBA 1 to LBA 100). Therefore, the map controller (not shown) may store the map segment 1 in the map storage 1110, and update the map segment 1 stored in the map storage 1110, based on the journal data 1. The LBA area 1 provided by the host is included in the LBA area (LBA 1 to LBA 100), and therefore, the map controller (not shown) may reflect the journal data stored in the journal data storage 1120 on the map segment 1, based on the map segment 1.

Similarly, the map segment 2 stored in the map storage 1110 may cover an LBA area (LBA 101 to LBA 200). Therefore, the map controller (not shown) may store the map segment 2 in the map storage 1110, and update the map segment 2 stored in the map storage 1110, based on the journal data 4. The LBA area 4 provided by the host is included in the LBA area (LBA 101 to LBA 200), and therefore, the map controller (not shown) may reflect the journal data stored in the journal data storage 1120 on the map segment 2, based on the map segment 2.

Since it is assumed that the map storage 1110 can store only two map segments, a program operation on the map segment 1 and the map segment 2, which are stored in the map storage 1110, is to be performed so as to reflect the journal data 2 and the journal data 3, which are stored in the journal data storage 1120, on the map segment. In addition, a read operation on the map segment 3 and the map segment 4 is to be performed, thereby storing read data in the map storage 1110.

As described above, when the number of map segments which the map storage 1110 can store is limited, program and read operations may be performed repetitively so as to reflect updated mapping information.

Figure 11:
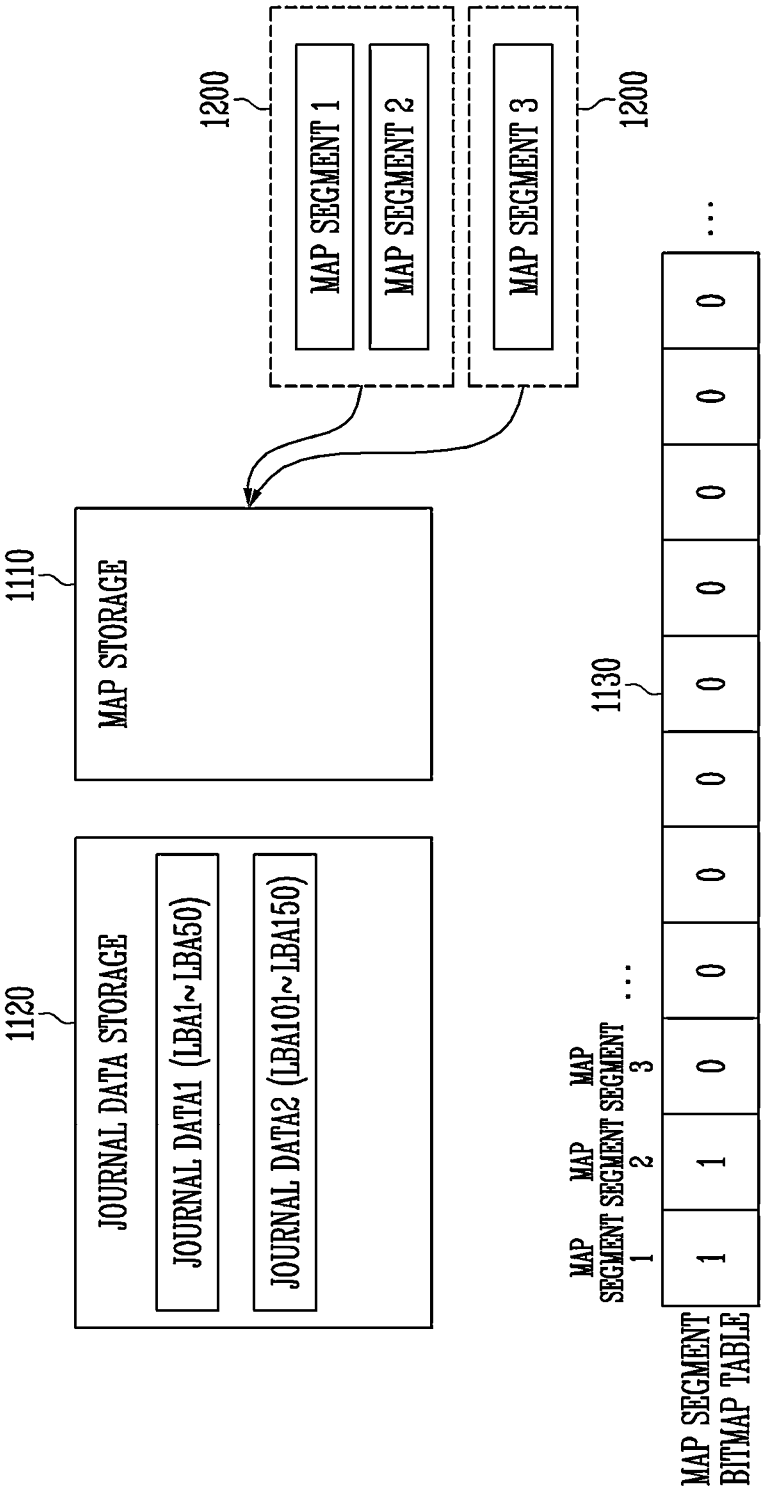
FIG. 11 is a diagram illustrating an operation of storing map segments in accordance with an embodiment of the present disclosure.

FIG. 11 is a diagram illustrating an operation of storing map segments in accordance with an embodiment of the present disclosure.

Referring to FIG. 11, the map controller (not shown) may store map segments in the map storage 1110.

For convenience of description, it is assumed that the map storage 1110 may store three map segments, and one map segment may cover 100 LBAs.

The controller may store data in a PBA area corresponding to an LBA provided by the host in response to a write request provided by the host. The map controller may store, in the journal data storage 1120, journal data including updated mapping information of the LBA provided by the host.

The map controller may store data in a PBA area corresponding to LBA area 1 (LBA 1 to LBA 50) in response to a write request provided by the host, and store, in the journal data storage 1120, journal data 1 including updated mapping information of LBA 1 to LBA 50. Similarly, the map controller may store data in a PBA area corresponding to LBA area 2 (LBA 101 to LBA 150) in response to a write request provided by the host, and store, in the journal data storage 1120, journal data 2 including updated mapping information of LBA 101 to LBA 150.

The map controller may calculate a ratio whenever a number of journal entries stored in the journal data storage 1120 becomes N (N is a positive integer) times of a number of LBAs covered by one map segment. The ratio may be a value obtained by dividing the number of journal entries stored in the journal data storage 1120 by the number of dirty map segments.

In an embodiment, 50 journal entries, which correspond to LBA 1 to LBA 50, respectively, and another 50 journal entries, which correspond to LBA 101 to LBA 150, respectively, may be stored in the journal data storage 1120.

Thus, the number of LBAs covered by one map segment is 100, and the number of journal entries stored in the journal data storage 1120 is 100 as one time of 100. Therefore, the value of N is 1. Thus, the map controller can calculate the ratio.

The map controller may calculate the ratio by dividing the number of journal entries stored in the journal data storage 1120 by the number of dirty map segments. The number of dirty map segments may be acquired based on the map segment bitmap table 1130.

In an embodiment, the map controller may calculate the ratio by dividing 100 as the number of journal entries stored in the journal data storage 1120 by 2 as the number of dirty map segments. The map controller may count a number of bitmaps in the set state (bit '1'), based on the map segment bitmap table 1130. That is, the map controller may count a number of bitmaps corresponding to map segment 1 and map segment 2, which have the set state. The map controller may calculate the ratio as 50 by dividing the number of journal entries by the number of dirty map segments.

When N is 1, and the calculated ratio is equal to or greater than a first reference value, the map controller may provide a map read command MAP_READ to the nonvolatile storage area 1200 to store a dirty map segment in the map storage 1110. The first reference value may be a value obtained by dividing the number of LBAs covered by one map segment by 2.

In an embodiment, the number of LBAs covered by one map segment is 100, and the value obtained by dividing 100 by 2 is 50. Therefore, the first reference value may be 50.

The map controller may compare the calculated ratio with the first reference value. Since the calculated ratio is 50 which is equal to or greater than the first reference value, the map controller may provide the map read command MAP_READ to the nonvolatile storage area 1200. Specifically, the map controller may provide the nonvolatile storage area 1200 with a map read command for the map segment 1 and the map segment 2 as dirty map segments. The map controller may store, in the map storage 1110, the map segment 1 and the map segment 2, which the nonvolatile storage area 1200 provide in response to the map read command MAP_READ.

The map controller may check a number of consecutive bitmaps in the set state, based on the map segment bitmap table 1130. When the number of consecutive bitmaps in the set state is equal to or greater than M (M is a positive number), the map controller may pre-store, in the map storage 1110, a map segment corresponding to a next bitmap of the consecutive bitmaps in the set state. The map controller may provide the nonvolatile storage area 1200 with a map read command MAP_READ for a map segment corresponding to the next bitmap of the consecutive bitmaps in the set state.

In an embodiment, the value of M may be 2.

In an embodiment, the map controller may check the number of consecutive bitmaps in the set state when the map read command MAP_READ for the map segment 1 and the map segment 2 is provided to the nonvolatile storage area 1200. The map controller may check that a bitmap corresponding to the map segment 1 is in the set state and a bitmap corresponding to the map segment 2 is in the set state. Since the number of consecutive bitmaps in the set state is equal to or greater than 2 as the value of M, the map controller may provide a map read command MAP_READ to the nonvolatile storage area 1200 to read map segment 3 as the map segment corresponding to the next bitmap of the consecutive bitmaps in the set state. The map controller may store, in the map storage 1110, the map segment 3 which the nonvolatile storage area 1200 provide in response to the map read command MAP_READ.

However, the present disclosure is not limited to this embodiment, and the number of map segments to be additionally read may also vary according to the capacity of the map storage.

FIG. 12 is a diagram illustrating a number of required consecutive dirty map segments in accordance with an embodiment of the present disclosure.

The map controller may store some map segments among map segments stored in the nonvolatile storage area. When a map segment including mapping information on an LBA provided by the host is not stored in the map storage, the map controller is to provide a map read command to the nonvolatile storage area to perform a read operation on the map segment. Also, in order to secure a space of the map storage, the map controller is to provide a program command to the nonvolatile storage area to program a map segment on which updated mapping information is reflected in the nonvolatile storage area.

As described above with reference to FIG. 11, when consecutive bitmaps in the set state appear M (M is a positive number) times or more, the map controller may pre-store, in the map storage, a map segment including mapping information on an LBA expected to be provided by the host.

Referring to FIG. 12, the value of M as a number of consecutive bitmaps in the set state, which is required to pre-store, in the map storage, the map segment including the mapping information on the LBA expected to be provided by the host may vary according to the capacity of the map storage.

For example, it is assumed that the map storage can store a relatively large number of map segments. Although the map storage stores map segments corresponding to next consecutive bitmaps in the set state in a state in which the number of consecutive bit maps in the set state is small, a residual capacity of the map storage may remain.

On the contrary, it is assumed that the map storage can store a relatively small number of map segments. When the map storage additionally stores map segments corresponding to next consecutive bitmaps in the set state in a state in which the number of consecutive bit maps in the set state is small, any residual capacity of the map storage may not remain. When an LBA corresponding to the additionally stored map segments is not input from the host, the additionally stored map segments are to be re-programmed in the nonvolatile storage area.

Therefore, in order to prevent occurrence of unnecessary latency, the value of M, which represents the number of consecutive bitmaps in the set state is to increase as the capacity of the map storage becomes smaller. That is, the map controller may pre-store expected map segments when it is sure that LBAs provided by the host are consecutive.

Figure 13:
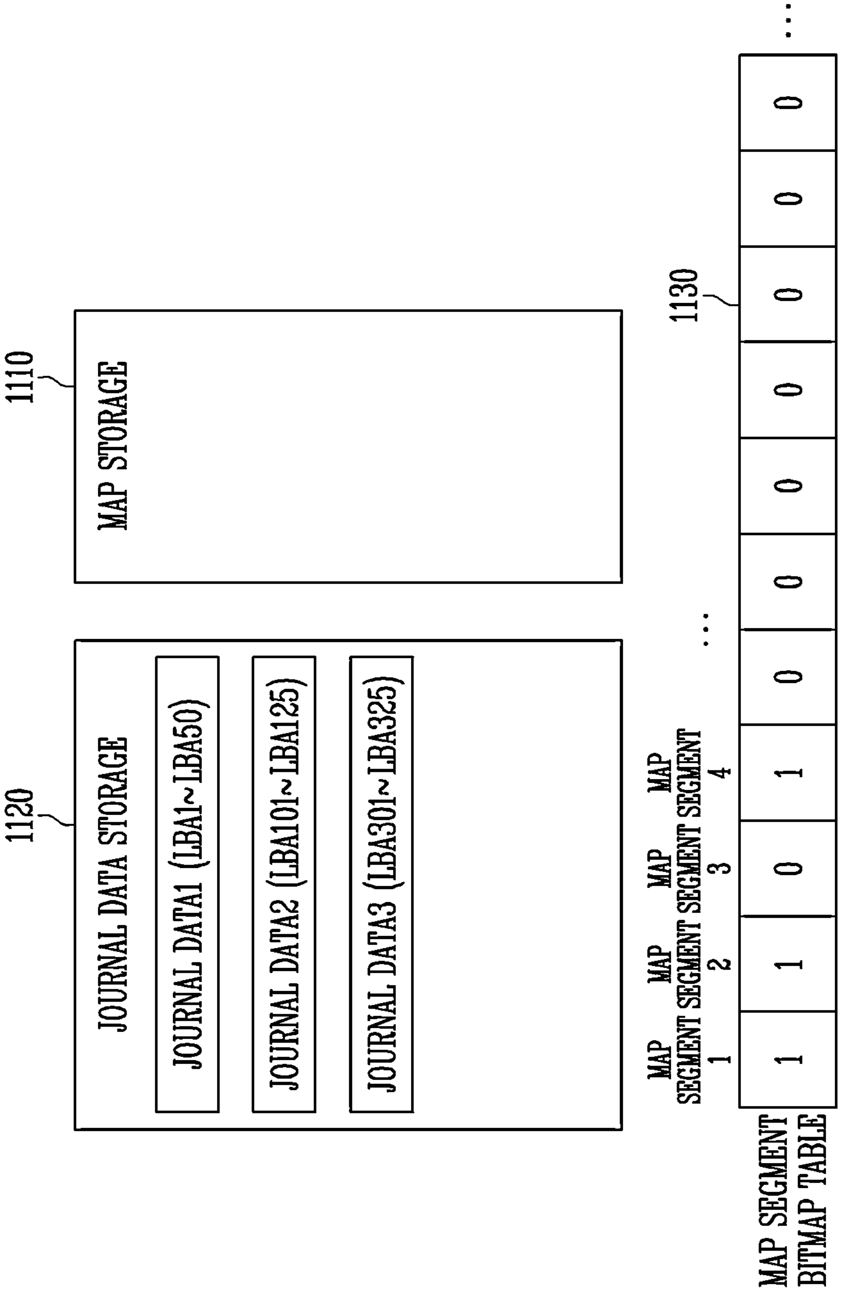
FIG. 13 is a diagram illustrating an operation of storing no dirty map segment in accordance with an embodiment of the present disclosure.

FIG. 13 is a diagram illustrating an operation of storing no dirty map segment in accordance with an embodiment of the present disclosure.

Referring to FIG. 13, the map controller may store no map segment in the map storage 1110.

For convenience of description, it is assumed that the map storage 1110 may store two map segments, and one map segment may cover 100 LBAs.

The controller may store data in a PBA area corresponding to an LBA provided by the host in response to a write request provided by the host. The map controller may store, in the journal data storage 1120, journal data including updated mapping information of the LBA provided by the host.

The map controller may store data in a PBA area corresponding to LBA area 1 (LBA 1 to LBA 50) in response to a write request provided by the host, and store, in the journal data storage 1120, journal data 1 including updated mapping information of LBA 1 to LBA 50.

The map controller may store data in a PBA area corresponding to LBA area 2 (LBA 101 to LBA 125) in response to a write request provided by the host, and store, in the journal data storage 1120, journal data 2 including updated mapping information of LBA 101 to LBA 125.

The map controller may store data in a PBA area corresponding to LBA area 3 (LBA 301 to LBA 325) in response to a write request provided by the host, and store, in the journal data storage 1120, journal data 3 including updated mapping information of LBA 301 to LBA 325.

The map controller may calculate a ratio whenever a number of journal entries stored in the journal data storage 1120 becomes N (N is a positive integer) times of a number of LBAs covered by one map segment. The ratio may be a value obtained by dividing the number of journal entries stored in the journal data storage 1120 by the number of dirty map segments.

In an embodiment, 50 journal entries respectively corresponding to LBA 1 to LBA 50, 25 journal entries respectively corresponding to LBA 101 to LBA 125, and 25 journal entries respectively corresponding to LBA 301 to LBA 325 may be stored in the journal data storage 1120.

That is, the number of LBAs covered by one map segment is 100, and the number of journal entries stored in the journal data storage 1120 is 100 as one time of 100. Therefore, the value of N is 1. Thus, the map controller can calculate the ratio.

The map controller may calculate the ratio by dividing the number of journal entries stored in the journal data storage 1120 by the number of dirty map segments. The number of dirty map segments may be acquired based on the map segment bitmap table 1130.

In an embodiment, the map controller may calculate the ratio by dividing 100 as the number of journal entries stored in the journal data storage 1120 by 3 as the number of dirty map segments. The map controller may count a number of bitmaps in the set state (bit '1'), based on the map segment bitmap table 1130. That is, the map controller may count a number of bitmaps corresponding to map segment 1, map segment 2, and map segment 4, which have the set state. The map controller may calculate the ratio as 33 by dividing the number of journal entries by the number of dirty map segments.

When N is 1, and the calculated ratio is less than a first reference value, the map controller may store no dirty map segment in the map storage 1110. The first reference value may be a value obtained by dividing the number of LBAs covered by one map segment by 2.

In an embodiment, the number of LBAs covered by one map segment is 100, and the value obtained by dividing 100 by 2 is 50. Therefore, the first reference value may be 50.

The map controller may compare the calculated ratio with the first reference value. Since the ratio calculated by the map controller is 33 which is less than the first reference value, the map controller may not provide the map read command MAP_READ to the nonvolatile storage area 1200.

When N is 1, and the calculated ratio is less than the first reference value, the map controller stores no dirty map segment in the map storage 1110, but may continuously store, in the journal data storage 1120, journal data including updated mapping information of an LBA provided by the host in response to a write request provided by the host.

The map controller may store journal data in the journal data storage 1120 until N becomes 2. When N becomes 2, the map controller may re-calculate a ratio. For example, when 200 journal entries are stored in the journal data storage 1120, the map controller may calculate a ratio.

Figure 14:
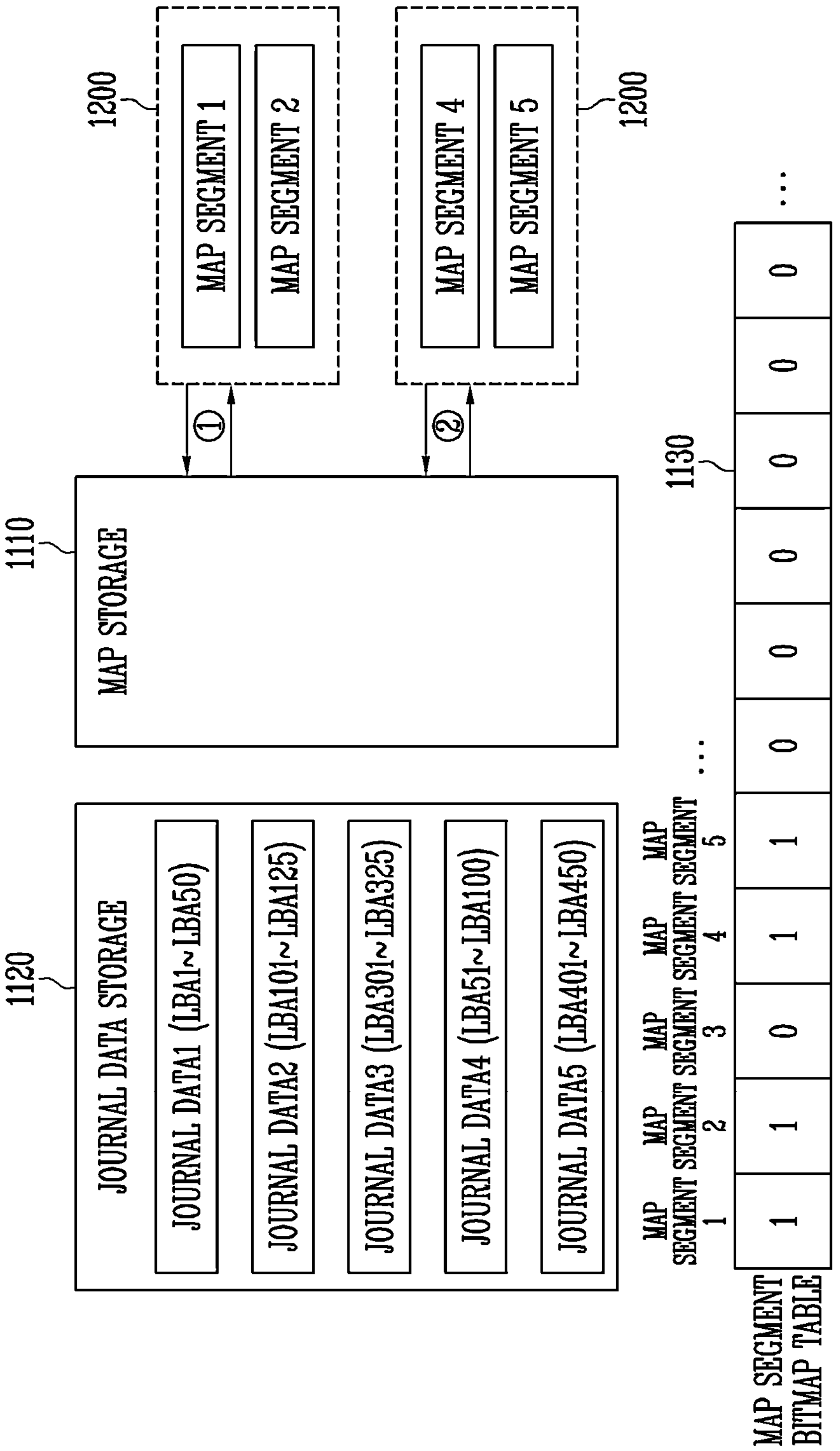
FIG. 14 is a diagram illustrating an operation of storing dirty map segments in accordance with an embodiment of the present disclosure.

FIG. 14 is a diagram illustrating an operation of storing dirty map segments in accordance with an embodiment of the present disclosure.

Referring to FIG. 14, the map controller may additionally store journal data 4 and journal data 5 in the journal data storage 1120 shown in FIG. 13.

As described above with reference to FIG. 13, the map controller stores no map segment in the map storage 1110, but may continuously store, in the journal data storage 1120, journal data including updated mapping information of an LBA provided by the host in response to a write request provided by the host.

For convenience of description, it is assumed that the map storage 1110 may store two map segments, and one map segment may cover 100 LBAs.

The map controller may store data in a PBA area corresponding to LBA area 4 (LBA 51 to LBA 100) in response to a write request provided by the host, and store, in the journal data storage 1120, journal data 4 including updated mapping information of LBA 51 to LBA 100.

The map controller may store data in a PBA area corresponding to LBA area 5 (LBA 401 to LBA 450) in response to a write request provided by the host, and store, in the journal data storage 1120, journal data 5 including updated mapping information of LBA 401 to LBA 450.

The map controller may calculate a ratio whenever a number of journal entries stored in the journal data storage 1120 becomes N (N is a positive integer) times of a number of LBAs covered by one map segment. The ratio may be a value obtained by dividing the number of journal entries stored in the journal data storage 1120 by the number of dirty map segments.

In an embodiment, 50 journal entries respectively corresponding to LBA 1 to LBA 50, 25 journal entries respectively corresponding to LBA 101 to LBA 125, 25 journal entries respectively corresponding to LBA 301 to LBA 325, 50 journal entries respectively corresponding to LBA 51 to LBA 100, and 50 journal entries respectively corresponding to LBA 401 to LBA 450 may be stored in the journal data storage 1120.

That is, the number of LBAs covered by one map segment is 100, and the number of journal entries stored in the journal data storage 1120 is 100 as one time of 100. Therefore, the value of N is 1. Thus, the map controller can calculate the ratio.

The map controller may calculate the ratio by dividing the number of journal entries stored in the journal data storage 1120 by the number of dirty map segments. The number of dirty map segments may be acquired based on the map segment bitmap table 1130.

In an embodiment, the map controller may calculate the ratio by dividing 200 as the number of journal entries stored in the journal data storage 1120 by 4 as the number of dirty map segments. The map controller may count a number of bitmaps in the set state (bit '1'), based on the map segment bitmap table 1130. That is, the map controller may count a number of bitmaps corresponding to map segment 1, map segment 2, map segment 4, and map segment 5, which have the set state. The map controller may calculate the ratio as 33 by dividing the number of journal entries by the number of dirty map segments.

When N is 2, and the calculated ratio is equal to or greater than a second reference value, the map controller may provide a map read command MAP_READ to the nonvolatile storage area to store dirty map segments in the map storage 1110.

The second reference value may be a value smaller than the first reference value. For example, the second reference value may be a value obtained by dividing a number of LBAs covered by one map segment by 4. In another example, the second reference value may be a value obtained by dividing a number of LBAs covered by one map segment by 3.

For example, when assuming that the second reference value is a value obtained by dividing the a number of LBAs covered by one map segment by 4, the second reference value may be 25 as a value obtained by dividing 100 by 4. In another example, when assuming that the second reference value is a value obtained by dividing the a number of LBAs covered by one map segment by 3, the second reference value may be 33 as a value obtained by dividing 100 by 3.

The map controller may compare the calculated ratio with the second reference value. Since the calculated ratio is 50 which is equal to or greater than the second reference value, the map controller may provide a map read command MAP_READ to the nonvolatile storage area 1200.

In an embodiment, the map controller may provide the nonvolatile storage area with a map read command MAP_READ for the map segment 1 and the map segment 2 as dirty map segments. The map controller may store, in the map storage 1110, the map segment 1 and the map segment 2, which the nonvolatile storage area 1200 provides in response to the map read command MAP_READ. The map storage may store the dirty map segments in an ascending order, based on the map segment bitmap table 1130.

The map storage may update map segments, based on the journal data 1, the journal data 2, and the journal data 4, which are stored in the journal data storage 1120. In an embodiment, the map storage may update mapping information included in the map segment 1 and the map segment 2, based on the journal entries stored in the journal data storage 1120.

When the mapping information included in the map segment 1 and the map segment 2 are updated, the map controller may provide the nonvolatile storage area 1200 with a program command for the map segment 1 and the map segment 2. The updated map segment 1 and the updated map segment 2 may be stored in the nonvolatile storage area 1200. In particular, as shown in FIG. 1, the updated map segment 1 and the updated map segment 2 may be stored in the map data storage area 1210.

In an embodiment, the map controller may provide the nonvolatile storage area 1200 with a map read command MAP_READ for the map segment 4 and the map segment 5 as dirty map segments. The map controller may store the map segment 4 and the map segment 5 in the map storage 1110 in response to the map read command MAP_READ.

The map storage may update map segments, based on the journal data 3 and the journal data 5, which are stored in the journal data storage 1120. In an embodiment, the map storage may update mapping information included in the map segment 4 and the map segment 5, based on the journal entries stored in the journal data storage 1120.

When the mapping information included in the map segment 4 and the map segment 5 are updated, the map controller may provide the nonvolatile storage area 1200 with a program command for the map segment 4 and the map segment 5. The updated map segment 4 and the updated map segment 5 may be stored in the nonvolatile storage area 1200. In particular, as shown in FIG. 1, the updated map segment 4 and the updated map segment 5 may be stored in the map data storage area 1210.

The map controller may update dirty map segments, based on journal entries included in journal data, and then update the map segment bitmap table 1130. When a dirty map segment is updated, the map controller may update a bitmap corresponding to the updated dirty map segment to be in the release state. The bitmap corresponding to the release state may represent bit '0.'

In an embodiment, when the map segment 1 is updated by reflecting the journal data 1 and the journal data 4 on the map segment 1, the map storage may update a bitmap corresponding to the map segment 1 to be in the release state. The bitmap corresponding to the map segment 1 may be changed to bit '0.'

In an embodiment, when the map segment 2 is updated by reflecting the journal data 2 on the map segment 2, the map storage may update a bitmap corresponding to the map segment 2 to be in the release state. The bitmap corresponding to the map segment 2 may be changed to bit '0.'

In an embodiment, when the map segment 3 is updated by reflecting the journal data 3 on the map segment 4, the map storage may update a bitmap corresponding to the map segment 4 to be in the release state. The bitmap corresponding to the map segment 4 may be changed to bit '0.'

In an embodiment, when the map segment 5 is updated by reflecting the journal data 5 on the map segment 5, the map storage may update a bitmap corresponding to the map segment 5 to be in the release state. The bitmap corresponding to the map segment 5 may be changed to bit '0.'

Figure 15:
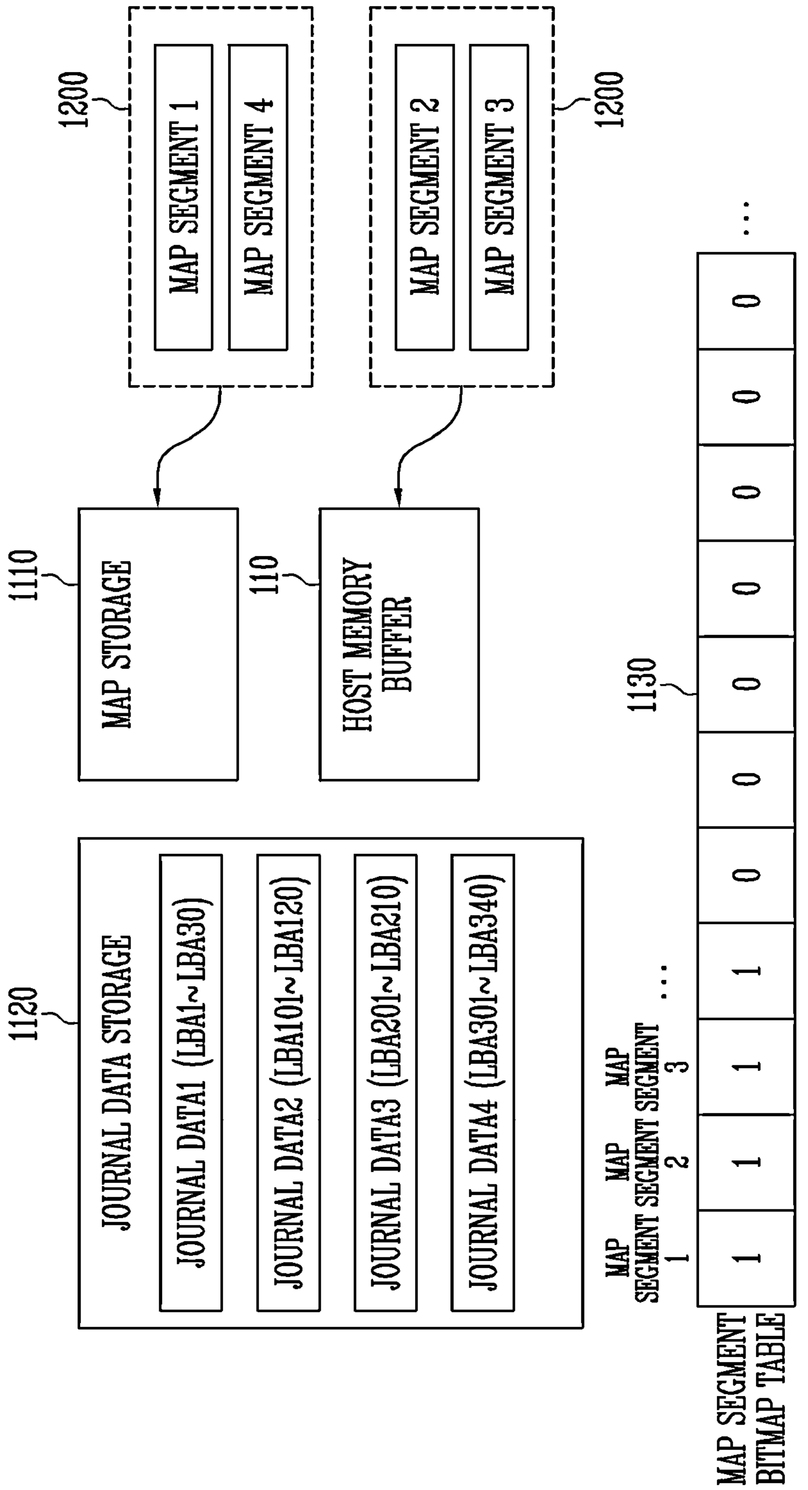
FIG. 15 is a diagram illustrating an operation of storing dirty map segments in a host memory buffer and a map storage in accordance with an embodiment of the present disclosure.

FIG. 15 is a diagram illustrating an operation of storing dirty map segments in the host memory buffer and the map storage in accordance with an embodiment of the present disclosure.

Referring to FIG. 15, the map controller may store map segments in the map storage 1110 and the host memory buffer 110.

As described above with reference to FIG. 13, the map controller may calculate a ratio whenever a number of journal entries stored in the journal data storage 1120 becomes N (N is a positive integer) times of a number of LBAs covered by one map segment. The ratio may be a value obtained by dividing the number of journal entries stored in the journal data storage 1120 by the number of dirty map segments.

Referring to FIG. 15, 30 journal entries respectively corresponding to LBA 1 to LBA 30, 20 journal entries respectively corresponding to LBA 101 to LBA 120, 10 journal entries respectively corresponding to LBA 201 to LBA 210, and 40 journal entries respectively corresponding to LBA 301 to LBA 340 may be stored in the journal data storage 1120.

The number of LBAs covered by one map segment is 100, and the number of journal entries stored in the journal data storage 1120 is 100 as one time of 100. Therefore, the value of N is 1. Thus, the map controller can calculate the ratio.

The map controller may calculate the ratio by dividing the number of journal entries stored in the journal data storage 1120 by the number of dirty map segments. The number of dirty map segments may be acquired based on the map segment bitmap table 1130.

In an embodiment, the map controller may calculate the ratio by dividing 100 as the number of journal entries stored in the journal data storage 1120 by 4 as the number of dirty map segments. The map controller may count a number of bitmaps in the set state (bit '1'), based on the map segment bitmap table 1130. That is, the map controller may count a number of bitmaps corresponding to map segment 1, map segment 2, map segment 3, and map segment 4, which have the set state. The map controller may calculate the ratio as 25 by dividing the number of journal entries by the number of dirty map segments.

When N is 1, and the calculated ratio is equal to or greater than a third reference value, the map controller may provide a map read command MAP_READ to the nonvolatile storage area 1200 to store dirty map segments in the map storage 1110 and the host memory buffer 110. The third reference value may be a value obtained by dividing a number of LBAs covered by one map segment by 4.

In an embodiment, the number of LBAs covered by one map segment is 100, and the value obtained by dividing the number of LBAs covered by one map segment by 4 is 100 25. Therefore, the third reference value may be 25.

The map controller may compare the calculated ratio with the third reference value. Since the calculated ratio is 25 which is equal to or greater than the third reference value, the map controller may provide a map read command MAP_READ to the nonvolatile storage area 1200. In an embodiment, the map controller may provide the nonvolatile storage area 1200 with a map read command for the map segment 1 to the map segment 4 as dirty map segments.

The map controller may determine map segments to be stored in the map storage 1110 and map segments to be stored in the host memory buffer 110. A method of determining map segments to be stored in the host memory buffer 110 will be described with reference to FIG. 16.

The map controller may store, in the map storage 1110, the map segment 1 and the map segment 4, which the nonvolatile storage area 1200 provides in response to the map read command MAP_READ.

The map controller may provide the host 100 to store, in the host memory buffer 110, the map segment 2 and the map segment 3, which the nonvolatile storage area 1200 provides in response to the map read command MAP_READ.

Figure 16:
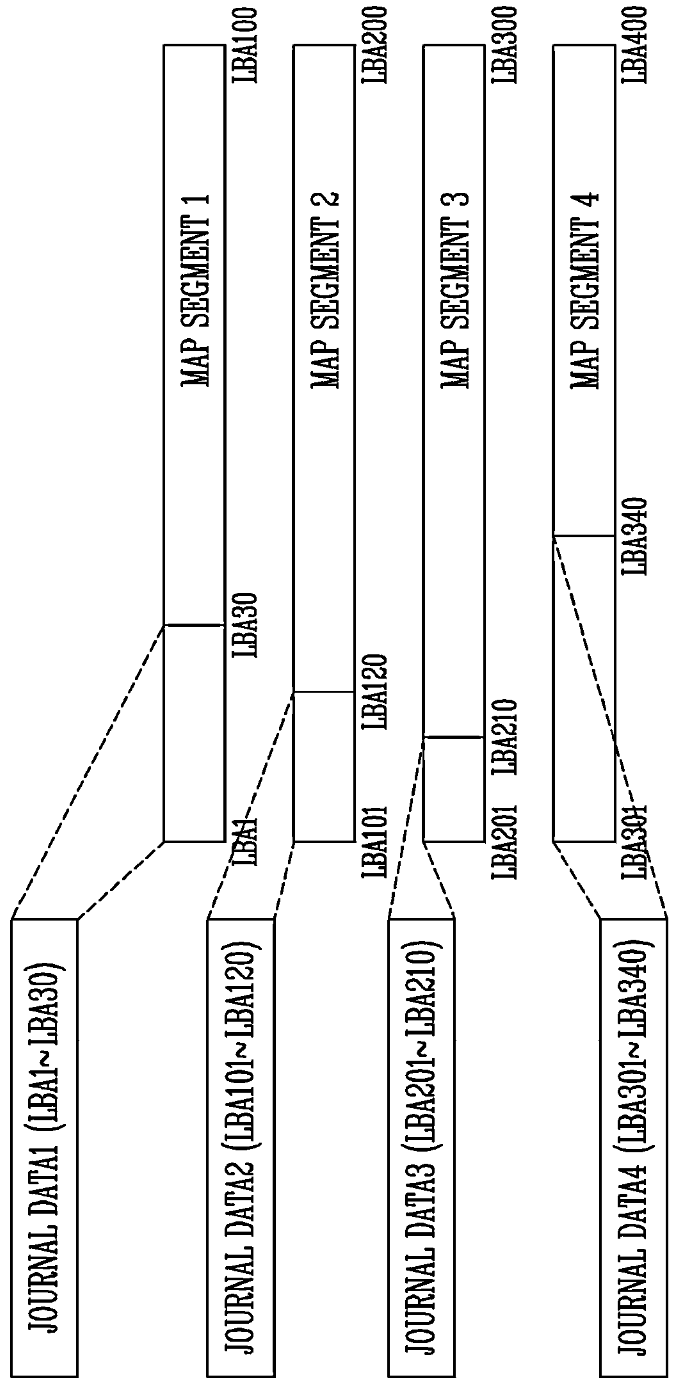
FIG. 16 is a diagram illustrating a process of determining dirty map segments to be stored in the host memory buffer and the map storage in accordance with an embodiment of the present disclosure.

FIG. 16 is a diagram illustrating a process of determining dirty map segments to be stored in the host memory buffer and the map storage in accordance with an embodiment of the present disclosure.

The map controller may store, in the map storage 1110, a dirty map segment including a large number of journal entries among dirty map segments.

In this specification, the dirty map segment may be relatively divided into a hot segment and a cold segment according to the size of an LBA area to be updated. The hot segment may be a map segment in which an LBA area to be updated is large in the LBA area covered by the corresponding map segment. Similarly, the cold segment may be a map segment in which an LBA area to be updated is small in the LBA area covered by the corresponding map segment. The hot segment and the cold segment may be divided based on the number of map entries to be updated.

In an embodiment, since an LBA area covered by map segment 1 is LBA 1 to LBA 100, LBA 1 to LBA 30 which are included in journal data 1, may be covered. That is, the map segment 1 includes mapping information on 30 journal entries. In other words, the map segment 1 may be in a state in which 30 map entries are to be updated.

Similarly, since an LBA area covered by map segment 2 is LBA 101 to LBA 200, LBA 101 to LBA 120 which are included in journal data 2, may be covered. That is, the map segment 2 includes mapping information on 20 journal entries. In other words, the map segment 2 may be in a state in which 20 map entries are to be updated.

Similarly, since an LBA area covered by map segment 3 is LBA 201 to LBA 300, LBA 201 to LBA 210 which are included in journal data 3, may be covered. That is, the map segment 3 includes mapping information on 10 journal entries. In other words, the map segment 3 may be in a state in which 10 map entries are to be updated.

Similarly, since an LBA area covered by map segment 3 is LBA 301 to LBA 400, LBA 301 to LBA 340 which are included in journal data 4, may be covered. That is, the map segment 4 includes mapping information on 40 journal entries. In other words, the map segment 4 may be in a state in which 40 map entries are to be updated.

Since numbers of map entries to be updated in the map segment 1 to the map segment 4 as dirty map segments are respectively 30, 20, 10, and 40, the map segment 4 in which the number of map entries to be updated is largest may be relatively a hot segment. In addition, the map segment 3 in which the number of map entries to be updated is smallest may be relatively a cold segment. The map controller may determine a map segment to be stored in the map storage 1110, based on the number of LBAs covered by each dirty map segment. The map controller may preferentially store, in the map storage 1110, hot segments among the dirty map segments.

When assuming that two map segments can be stored in the map storage 1110, the map controller may determine two map segments to be stored in the map storage 1110.

In an embodiment, the map controller may store, in the map storage 1110, the map segment 4 in which the number of covered LBAs is largest and the map segment 1 in which the number of covered LBAs is second largest.

When the map controller cannot store any dirty map segments in the map storage 1110, the map controller may provide dirty map segments to the host to store the dirty map segments in the host memory buffer 110.

In an embodiment, the map controller may provide the host with the map segment 2 in which the number of covered LBAs is small and the map segment 3 in which the number of covered LBAs is smallest to store the map segment 2 and the map segment 3 in the host memory buffer 110.

Figure 17:
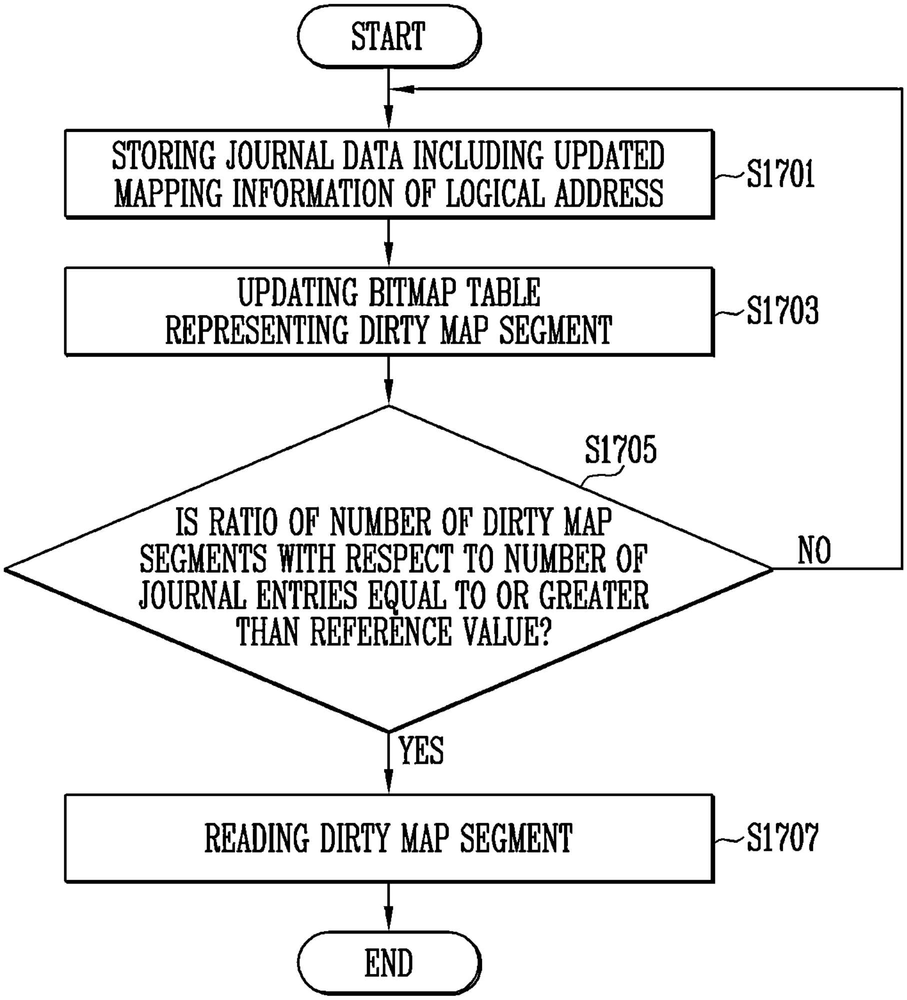
FIG. 17 is a flowchart illustrating an operation of the controller in accordance with an embodiment of the present disclosure.

FIG. 17 is a flowchart illustrating an operation of the controller in accordance with an embodiment of the present disclosure.

In step S1701, the controller may store data in a PBA area corresponding to an LBA provided by the host in response to a write request provided by the host, and store journal data including updated mapping information of LBAs provided by the host. The journal data may be a set of journal entries as updated mapping information of one logical address.

In step S1703, the controller may update the map segment bitmap table representing dirty map segments. The controller may acquire a logical address included in journal entries stored in the journal data storage, and determine, as a dirty map segment, a map segment including mapping information on the acquired logical address. The controller may update a bitmap corresponding to the dirty map segment to be in the set state. The bit map in the set state may be bit '1.'

In step S1705, the controller may calculate a ratio of a number of dirty map segments with respect to a number of journal entries. The controller may calculate a ratio whenever the number of journal entries becomes N (N is a positive integer) times of the number of LBAs covered by one map segment. The controller may count a number of bitmaps in the set state, based on the map segment bitmap table. The controller may calculate a ratio by dividing the number of journal entries by the number of dirty map segments.

The controller may compare the calculated ratio with a reference value. When N is 1, the controller may check whether the calculated ratio is equal to or greater than a first reference value. When the calculated ratio is less than the first reference value, the controller may re-store journal data provided by the host (S1701). The first reference value may be a value obtained by dividing the number of map entries included in one map segment by 2.

In step S1707, when the calculated ratio is equal to or greater than the first reference value, the controller may read a dirty map segment. The controller may check the dirty map segment, based on the map segment bitmap table, and provide a map read command to the nonvolatile storage area to read the checked dirty map segment.

Figure 18:
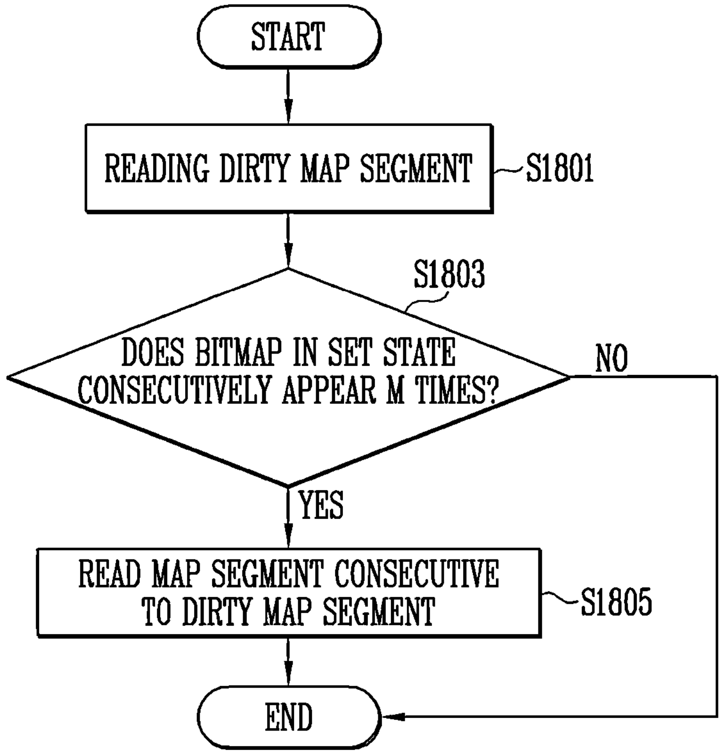
FIG. 18 is a flowchart illustrating an operation of the controller in accordance with another embodiment of the present disclosure.

FIG. 18 is a flowchart illustrating an operation of the controller in accordance with another embodiment of the present disclosure.

In step S1801, the controller may read a dirty map segment. The dirty map segment may be a map segment to be updated based on journal data. The controller may check the dirty map segment, based on the map segment bitmap table, and provide a map read command to the nonvolatile storage area to read the checked dirty map segment.

In an embodiment, the step S1801 may be identical to the step S1707 described above with reference to FIG. 17.

In step S1803, the controller may check consecutiveness of dirty map segments, based on the map segment bitmap table. The controller may check a number of dirty map segments which continuously appear. For example, the controller may check whether a bitmap in the set state appears M (M is a positive integer) times, based on the map segment bit map table. The value of M is a predetermined value, and may vary according to a design.

In an embodiment, when the bitmap in the set state appears M times in the map segment bitmap table, in step S1805, the controller may further read a map segment consecutive to the dirty map segment. That is, the controller may read a map segment corresponding to a bitmap in the release state as a next bitmap of the bitmap in the set state, which consecutively appears M times in the map segment bitmap table.

Figure 19:
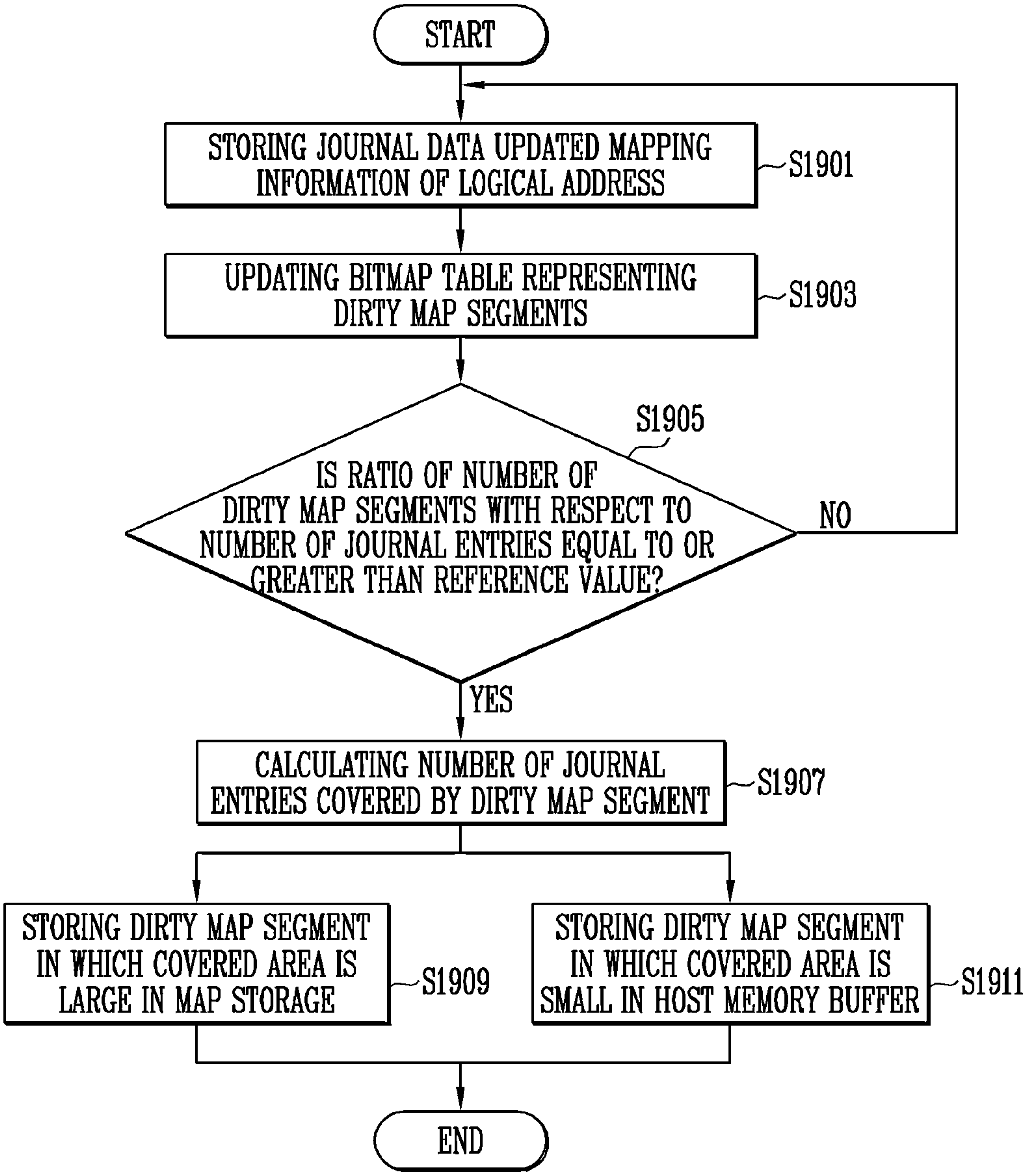
FIG. 19 is a flowchart illustrating an operation of the controller in accordance with another embodiment of the present disclosure.

FIG. 19 is a flowchart illustrating an operation of the controller in accordance with another embodiment of the present disclosure.

In step S1901, the controller may store data in a PBA area corresponding to an LBA provided by the host in a write request provided by the host, and store journal data including updated mapping information of LBAs provided by the host. The journal data may be a set of journal entries as updated mapping information of one logical address.

In step S1903, the controller may update the map segment bitmap table representing dirty map segments. The controller may acquire a logical address included in journal entries stored in the journal data storage, and determine, as a dirty map segment, a map segment including mapping information on the acquired logical address. The controller may update a bitmap corresponding to the dirty map segment to be in the set state. The bit map in the set state may be bit '1.'

In step S1905, the controller may calculate a ratio of a number of dirty map segments with respect to a number of journal entries. The controller may calculate a ratio whenever the number of journal entries becomes N (N is a positive integer) times of a number of LBAs covered by one map segment. The controller may count a number of bitmaps in the set state, based on the map segment bitmap table. The controller may calculate a ratio by dividing the number of journal entries by the number of dirty map segments.

The controller may compare the calculated ratio with a reference value. When N is 1, the controller may check whether the calculated ratio is equal to or greater than a third reference value. When the calculate ratio is less than the third reference value, the controller may re-store journal data provided by the host (S1901). The third reference value may be a value obtained by dividing a number of map entries included in one map segment by 4.

In step S1907, the controller may calculate a number of journal entries covered by each dirty map segment. Specifically, the controller may compare numbers of journal entries covered by the respective dirty map segments, thereby determining that map segments in which numbers of covered journal entries are small are stored in the host memory buffer.

In step S1909, the controller may store dirty map segments in which a covered LBA area is large in the map storage.

In step S1911, the controller may store dirty map segments in which a covered LBA area is small in the host memory buffer. In an embodiment, the controller may compare numbers of journal entries covered by the respective dirty map segments, thereby providing map segments to the host to store map segments in which numbers of covered journal entries are small in the host memory buffer.

In an embodiment, the steps S1909 and S1911 may be simultaneously performed.

Figure 20:
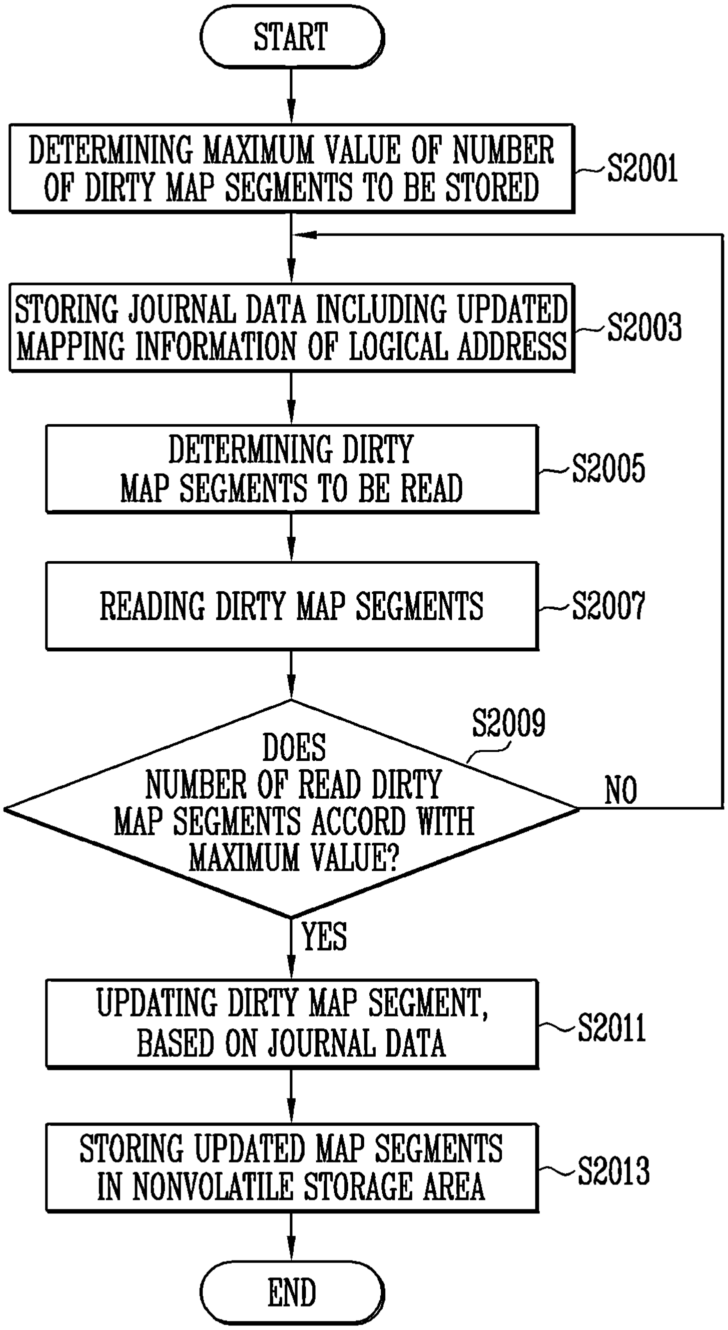
FIG. 20 is a flowchart illustrating an operation of a storage device in accordance with an embodiment of the present disclosure.

FIG. 20 is a flowchart illustrating an operation of the storage device in accordance with an embodiment of the present disclosure.

In step S2001, the storage device may determine a maximum value of a number of dirty map segments to be stored. The maximum value of the number of dirty map segments to be stored may be determined based on the capacity of the power providing circuit. The maximum value of the number of dirty map segments to be stored may be a maximum value of a number of map segments to be stored in the nonvolatile storage area, based on power provided by the power providing circuit in response to sudden power off.

In step S2003, the storage device may store journal data including updated mapping information of a logical address provided by the host. The journal data may be a set of journal entries as updated mapping information one logical address.

In step S2005, the storage device may determine a dirty map segment to be read. The storage device may compare a ratio obtained by dividing a number of journal entries by the number of dirty map segments with a reference value, thereby determining a dirty map segment to be read.

In step S2007, the storage device may read dirty map segments. The read dirty map segments may be map segments to be updated based on the journal entries.

In step S2009, the storage device may check whether a number of the read dirty map segments accords with the determined maximum value. The storage device may read dirty map segments until the number of the read dirty map segments becomes equal to the determined maximum value (S2003 to S2007).

In step S2011, the storage device may update the stored dirty map segments, based on journal data. The storage device may update map entries included in a dirty map segment, based on the journal entries. For example, the storage device may change a PBA included in a map entry, based on the journal entries.

In step S2013, the storage device may store the updated map segments in the nonvolatile storage area.

Figure 21:
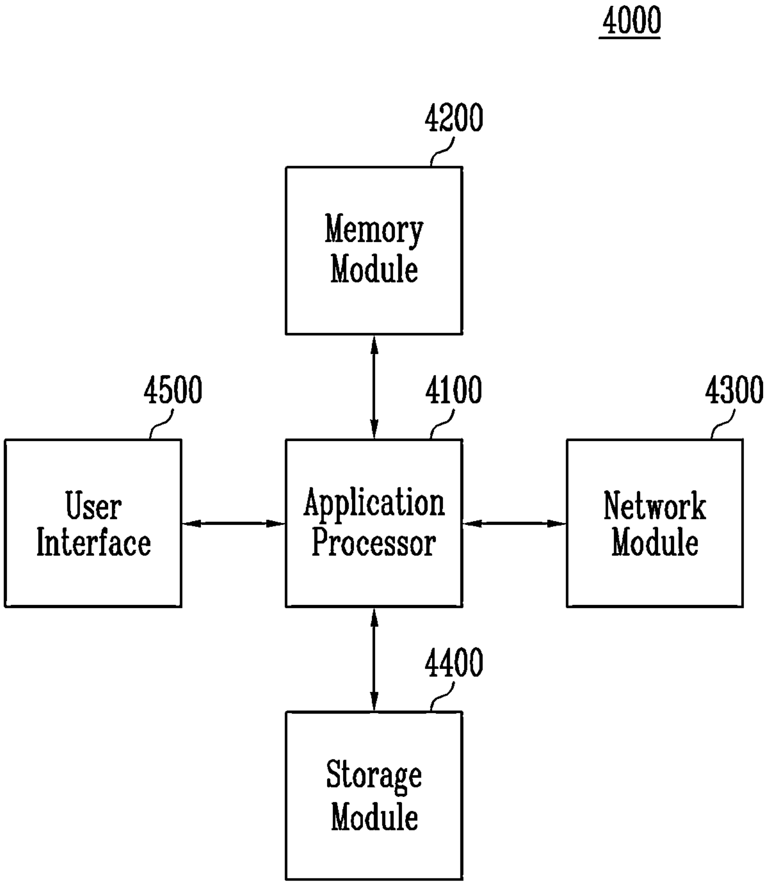
FIG. 21 is a diagram illustrating a user system to which the storage device is applied in accordance with an embodiment of the present disclosure.

FIG. 21 is a diagram illustrating a user system to which the storage device is applied in accordance with an embodiment of the present disclosure.

Referring to FIG. 21, the user system 4000 includes an application processor 4100, a memory module 4200, a network module 4300, a storage module 4400, and a user interface 4500.

The application processor 4100 may drive components included in the user system 4000, an operating system (OS), a user program, or the like. Exemplarily, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include a volatile random access memory such as a DRAM, an SDRAM, a DDR SDRAM, a DDR2 SDRAM, a DDR3 SDRAM, an LPDDR SDRAM, an LPDDR2 SDRAM, or an LPDDR3 SDRAM, or a nonvolatile random access memory such as a PRAM, a ReRAM, an MRAM, or an FRAM. Exemplarily, the application processor 4100 and the memory module 4200 may be packaged based on a Package on Package (POP) to be provided as one semiconductor package.

The network module 4300 may communicate with external devices. Exemplarily, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. Exemplarily, the network module 4300 may be included in the application processor 4100.

The storage module 4400 may store data. For example, the storage module 4400 may store data received from the application processor 4100. Alternatively, the storage module 4400 may transmit data stored therein to the application processor 4100. Exemplarily, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. Exemplarily, the storage module 4400 may be provided as a removable drive such as a memory card of the user system 4000 or an external drive.

Exemplarily, the storage module 4400 may include a plurality of nonvolatile memory devices, and the plurality of nonvolatile memory devices may operate identically to the nonvolatile storage area 1200 described with reference to FIG. 1. The storage module 4400 may be operated identically to the storage device 1000 described with reference to FIG. 1.

The user interface 4500 may include interfaces for inputting data or commands to the application processor 4100 or outputting data to an external device. Exemplarily, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

Some implementations of the disclosed technology provide an electronic device that can efficiently use a map caching area of the electronic device.

While the present disclosure has been shown and described with reference to certain exemplary embodiments thereof, it will be understood by those skilled in the art that various changes may be made.

The embodiments disclosed in this patent document are only examples to facilitate an understanding of the disclosed technology, and the disclosed technology is not limited thereto.

While various embodiments have been described above, variations and improvements of the disclosed embodiments and other embodiments may be made based on what is described or illustrated in this document.

What is claimed is:

1. A storage device comprising:

a nonvolatile memory device configured to store map segments including mapping information between a logical address provided by a host and a physical address corresponding to the logical address;

a journal data storage configured to store journal data including updated mapping information of the logical address;

a map storage configured to store first map segments to be updated based on the journal data;

a power providing circuit configured to provide power to the nonvolatile memory device; and a map controller configured to determine a maximum value of a number of first map segments to be stored in the map storage, based on a capacity of the power provided by the power providing circuit.

2. The storage device of claim 1, further comprising a bitmap table representing the first map segments.

3. The storage device of claim 2, wherein the map controller is configured to store the first map segments in the map storage when a ratio of a number of journal entries stored in the journal data storage and a number of the first map segments which are acquired based on the bitmap table is equal of greater than a first reference value.

4. The storage device of claim 3, wherein a maximum value of a number of the first map segments is a maximum value of a number of the map segments to be stored in the nonvolatile memory device, based on power provided by the power providing circuit in response to sudden power off.

5. The storage device of claim 4, wherein the map controller is configured to update the mapping information included in the first map segments based on the journal data.

6. The storage device of claim 5, wherein the map controller is configured to control the nonvolatile memory device to store the updated first map segments in the nonvolatile memory device when the number of the first map segments is equal to the maximum.

7. A method of operating a storage device, the method comprising:

determining a maximum value of a number of first map segments to be stored in a map storage based on a capacity of power provided by a power providing circuit, the first map segments corresponding to map segments to be updated;

storing journal data to reflect changes in mapping between physical addresses in a memory device for storing data and corresponding logical addresses for the data, the changes in the mapping being stored as updated mapping information of a logical address provided by a host;

determining first map segments to be read; and reading the first map segments until the number of the first map segments stored in the map storage becomes equal to the maximum value.

8. The method of claim 7, wherein, when a ration of a number of the first map segments for journal entries included in the journal data is equal or greater than a first reference value, the determining the first map segments to be read is performing.

9. The method of claim 7, wherein the maximum value of a number of the first map segments to be stored is a maximum value of a number of map segments to be stored in a nonvolatile memory device, based on power provided by he power providing circuit in response to sudden power off.

10. The method of claim 7, the method further comprising:

updating read the first map segments based on the journal data; and storing the updated first map segments in a nonvolatile memory device.

* * * * *